(12) United States Patent
Athsani et al.

(10) Patent No.: US 8,108,778 B2
(45) Date of Patent: Jan. 31, 2012

(54) SYSTEM AND METHOD FOR CONTEXT ENHANCED MAPPING WITHIN A USER INTERFACE

(75) Inventors: Athellina Athsani, San Jose, CA (US); Christopher T. Paretti, San Francisco, CA (US); Joseph James O'Sullivan, Oakland, CA (US); Ronald Martinez, San Francisco, CA (US); Marc Eliot Davis, San Francisco, CA (US); Christopher William Higgins, Portland, OR (US); Christopher Kalaboukis, Los Gatos, CA (US)

(73) Assignee: Yahoo! Inc., Sunnyvale, CA (US)

( * ) Notice: Subject to any disclaimer, the term of this patent is extended or adjusted under 35 U.S.C. 154(b) by 665 days.

(21) Appl. No.: 12/241,590

(22) Filed: Sep. 30, 2008

(65) Prior Publication Data

US 2010/0083169 A1    Apr. 1, 2010

(51) Int. Cl.
*G06F 13/00* (2006.01)
*G06F 15/00* (2006.01)

(52) U.S. Cl. .................................. 715/738; 715/762
(58) Field of Classification Search .................. 715/700, 715/763, 765, 853, 851, 855, 738, 762, 735–736
See application file for complete search history.

(56) References Cited

U.S. PATENT DOCUMENTS

| | | |
|---|---|---|
| 5,446,891 A | 8/1995 | Kaplan et al. |
| 5,493,692 A | 2/1996 | Theimer et al. |
| 5,583,763 A | 12/1996 | Atcheson et al. |
| 5,651,068 A | 7/1997 | Klemba et al. |
| 5,761,662 A | 6/1998 | Dasan |
| 5,764,906 A | 6/1998 | Edelstein et al. |
| 5,781,879 A | 7/1998 | Arnold et al. |
| 5,784,365 A | 7/1998 | Ikeda |
| 5,794,210 A | 8/1998 | Goldhaber et al. |
| 5,802,510 A | 9/1998 | Jones |
| 5,835,087 A | 11/1998 | Herz |
| 5,903,848 A | 5/1999 | Takahashi |
| 5,920,854 A | 7/1999 | Kirsch et al. |
| 6,014,638 A | 1/2000 | Burge et al. |
| 6,021,403 A | 2/2000 | Horvitz et al. |
| 6,047,234 A | 4/2000 | Cherveny et al. |
| 6,098,065 A | 8/2000 | Skillen et al. |
| 6,112,181 A | 8/2000 | Shear et al. |

(Continued)

FOREIGN PATENT DOCUMENTS

EP    1362302    11/2003

(Continued)

OTHER PUBLICATIONS

U.S. Appl. No. 11/593,668, filed Nov. 6, 2006 for Naaman, et al.

(Continued)

*Primary Examiner* — Cao "Kevin" Nguyen
(74) *Attorney, Agent, or Firm* — James J. DeCarlo; Greenberg Traurig, LLP

(57) ABSTRACT

A system and method for Context Enhanced Mapping. A request is received from a user over a network for a map comprising an identification of a physical location, and at least one criteria. The physical location is mapped. Spatial, temporal, topical, and social data available to the network relating to the physical location and criteria is retrieved using a global index of data available to the network and prioritized for inclusion based upon the user and context of the request. The map of the physical location and at least some of the retrieved spatial, temporal, topical, and social data is displayed on a user interface.

28 Claims, 20 Drawing Sheets

U.S. PATENT DOCUMENTS

| | | |
|---|---|---|
| 6,157,924 A | 12/2000 | Austin |
| 6,169,992 B1 | 1/2001 | Beall et al. |
| 6,212,552 B1 | 4/2001 | Biliris et al. |
| 6,266,667 B1 | 7/2001 | Olsson |
| 6,314,365 B1 | 11/2001 | Smith |
| 6,314,399 B1 | 11/2001 | Deligne et al. |
| 6,324,519 B1 | 11/2001 | Eldering |
| 6,327,590 B1 | 12/2001 | Chidlovskii et al. |
| 6,446,065 B1 | 9/2002 | Nishioka et al. |
| 6,490,698 B1 | 12/2002 | Horvitz et al. |
| 6,502,033 B1 | 12/2002 | Phuyal |
| 6,523,172 B1 | 2/2003 | Martinez-Guerra et al. |
| 6,571,279 B1 | 5/2003 | Herz et al. |
| 6,601,012 B1 | 7/2003 | Horvitz et al. |
| 6,662,195 B1 | 12/2003 | Langseth et al. |
| 6,665,640 B1 | 12/2003 | Bennett et al. |
| 6,694,316 B1 | 2/2004 | Langseth et al. |
| 6,701,311 B2 | 3/2004 | Biebesheimer et al. |
| 6,701,315 B1 | 3/2004 | Austin |
| 6,708,203 B1 | 3/2004 | Maker et al. |
| 6,731,940 B1 | 5/2004 | Nagendran |
| 6,741,980 B1 | 5/2004 | Langseth et al. |
| 6,757,661 B1 | 6/2004 | Blaser et al. |
| 6,773,344 B1 | 8/2004 | Gabai et al. |
| 6,781,920 B2 | 8/2004 | Bates et al. |
| 6,785,670 B1 | 8/2004 | Chiang et al. |
| 6,789,073 B1 | 9/2004 | Lunenfeld |
| 6,813,501 B2 | 11/2004 | Kinnunen et al. |
| 6,816,850 B2 | 11/2004 | Culliss |
| 6,829,333 B1 | 12/2004 | Frazier |
| 6,834,195 B2 | 12/2004 | Brandenberg et al. |
| 6,842,761 B2 | 1/2005 | Diamond et al. |
| 6,845,370 B2 | 1/2005 | Burkey et al. |
| 6,850,252 B1 | 2/2005 | Hoffberg |
| 6,853,913 B2 | 2/2005 | Cherveny et al. |
| 6,853,982 B2 | 2/2005 | Smith et al. |
| 6,882,977 B1 | 4/2005 | Miller |
| 6,904,160 B2 | 6/2005 | Burgess |
| 6,931,254 B1 | 8/2005 | Egner et al. |
| 6,961,660 B2 | 11/2005 | Underbrink et al. |
| 6,961,731 B2 | 11/2005 | Holbrook |
| 6,985,839 B1 | 1/2006 | Motamedi et al. |
| 7,010,492 B1 | 3/2006 | Bassett et al. |
| 7,027,801 B1 | 4/2006 | Hall et al. |
| 7,058,508 B2 | 6/2006 | Combs et al. |
| 7,058,626 B1 | 6/2006 | Pan et al. |
| 7,062,510 B1 | 6/2006 | Eldering |
| 7,065,345 B2 | 6/2006 | Carlton et al. |
| 7,065,483 B2 | 6/2006 | Decary et al. |
| 7,069,308 B2 | 6/2006 | Abrams |
| 7,073,129 B1 | 7/2006 | Robarts et al. |
| 7,110,776 B2 | 9/2006 | Sambin |
| 7,143,091 B2 | 11/2006 | Charnock et al. |
| 7,149,696 B2 | 12/2006 | Shimizu et al. |
| 7,181,438 B1 | 2/2007 | Szabo |
| 7,185,286 B2 | 2/2007 | Zondervan |
| 7,194,512 B1 | 3/2007 | Creemer et al. |
| 7,203,597 B2 | 4/2007 | Sato et al. |
| 7,209,915 B1 | 4/2007 | Taboada et al. |
| 7,219,013 B1 | 5/2007 | Young et al. |
| 7,236,969 B1 | 6/2007 | Skillen et al. |
| 7,254,581 B2 | 8/2007 | Johnson et al. |
| 7,257,570 B2 | 8/2007 | Riise et al. |
| 7,305,445 B2 | 12/2007 | Singh et al. |
| 7,320,025 B1 | 1/2008 | Steinberg et al. |
| 7,321,824 B1 * | 1/2008 | Nesbitt .......................... 701/201 |
| 7,343,364 B2 | 3/2008 | Bram et al. |
| 7,395,507 B2 | 7/2008 | Robarts et al. |
| 7,404,084 B2 | 7/2008 | Fransdonk |
| 7,437,312 B2 | 10/2008 | Bhatia et al. |
| 7,451,102 B2 | 11/2008 | Nowak |
| 7,461,168 B1 | 12/2008 | Wan |
| 7,496,548 B1 | 2/2009 | Ershov |
| 7,522,995 B2 | 4/2009 | Nortrup |
| 7,529,811 B2 | 5/2009 | Thompson |
| 7,562,122 B2 | 7/2009 | Oliver et al. |
| 7,577,665 B2 | 8/2009 | Rameer et al. |
| 7,584,215 B2 | 9/2009 | Saari et al. |
| 7,624,104 B2 | 11/2009 | Berkhin et al. |
| 7,624,146 B1 | 11/2009 | Brogne et al. |
| 7,634,465 B2 | 12/2009 | Sareen et al. |
| 7,657,907 B2 | 2/2010 | Fennan et al. |
| 7,681,147 B2 | 3/2010 | Richardson-Bunbury et al. |
| 7,725,492 B2 | 5/2010 | Sittig et al. |
| 7,729,901 B2 | 6/2010 | Richardson-Bunbury et al. |
| 7,769,740 B2 | 8/2010 | Martinez |
| 7,769,745 B2 | 8/2010 | Naaman |
| 7,783,622 B1 | 8/2010 | Vandermolen et al. |
| 7,792,040 B2 | 9/2010 | Nair |
| 7,802,724 B1 | 9/2010 | Nohr |
| 7,822,871 B2 | 10/2010 | Stolorz et al. |
| 7,831,586 B2 | 11/2010 | Reitter et al. |
| 7,865,308 B2 | 1/2011 | Athsani |
| 7,925,708 B2 | 4/2011 | Davis et al. |
| 2001/0013009 A1 | 8/2001 | Greening et al. |
| 2001/0035880 A1 | 11/2001 | Musatov et al. |
| 2001/0047384 A1 | 11/2001 | Croy |
| 2001/0052058 A1 | 12/2001 | Ohran |
| 2002/0014742 A1 | 2/2002 | Conte et al. |
| 2002/0019849 A1 | 2/2002 | Tuvey et al. |
| 2002/0019857 A1 | 2/2002 | Harjanto |
| 2002/0023091 A1 | 2/2002 | Silberberg et al. |
| 2002/0023230 A1 | 2/2002 | Bolnick et al. |
| 2002/0035605 A1 | 3/2002 | McDowell et al. |
| 2002/0049968 A1 | 4/2002 | Wilson et al. |
| 2002/0052786 A1 | 5/2002 | Kim et al. |
| 2002/0052875 A1 | 5/2002 | Smith et al. |
| 2002/0054089 A1 | 5/2002 | Nicholas |
| 2002/0065844 A1 | 5/2002 | Robinson et al. |
| 2002/0069218 A1 | 6/2002 | Sull et al. |
| 2002/0099695 A1 | 7/2002 | Abajian et al. |
| 2002/0103870 A1 | 8/2002 | Shouji |
| 2002/0111956 A1 | 8/2002 | Yeo et al. |
| 2002/0112035 A1 | 8/2002 | Carey |
| 2002/0133400 A1 | 9/2002 | Terry et al. |
| 2002/0138331 A1 | 9/2002 | Hosea et al. |
| 2002/0152267 A1 | 10/2002 | Lennon |
| 2002/0169840 A1 | 11/2002 | Sheldon et al. |
| 2002/0173971 A1 | 11/2002 | Stirpe et al. |
| 2002/0178161 A1 | 11/2002 | Brezin et al. |
| 2002/0198786 A1 | 12/2002 | Tripp et al. |
| 2003/0008661 A1 | 1/2003 | Joyce et al. |
| 2003/0009367 A1 | 1/2003 | Morrison |
| 2003/0009495 A1 | 1/2003 | Adjaoute |
| 2003/0027558 A1 | 2/2003 | Eisinger |
| 2003/0032409 A1 | 2/2003 | Hutcheson et al. |
| 2003/0033331 A1 | 2/2003 | Sena et al. |
| 2003/0033394 A1 | 2/2003 | Stine et al. |
| 2003/0065762 A1 | 4/2003 | Stolorz et al. |
| 2003/0069877 A1 | 4/2003 | Grefenstette et al. |
| 2003/0069880 A1 | 4/2003 | Harrison et al. |
| 2003/0078978 A1 | 4/2003 | Lardin et al. |
| 2003/0080992 A1 | 5/2003 | Haines |
| 2003/0126250 A1 | 7/2003 | Jhanji |
| 2003/0149574 A1 | 8/2003 | Rudman |
| 2003/0154293 A1 | 8/2003 | Zmolek |
| 2003/0165241 A1 | 9/2003 | Fransdonk |
| 2003/0191816 A1 | 10/2003 | Landress et al. |
| 2004/0010492 A1 | 1/2004 | Zhao et al. |
| 2004/0015588 A1 | 1/2004 | Cotte |
| 2004/0030798 A1 | 2/2004 | Andersson et al. |
| 2004/0034752 A1 | 2/2004 | Ohran |
| 2004/0043758 A1 | 3/2004 | Sorvari et al. |
| 2004/0044736 A1 | 3/2004 | Austin-Lane et al. |
| 2004/0070602 A1 | 4/2004 | Kobuya et al. |
| 2004/0139025 A1 | 7/2004 | Coleman |
| 2004/0139047 A1 | 7/2004 | Rechsteiner |
| 2004/0148341 A1 | 7/2004 | Cotte |
| 2004/0152477 A1 | 8/2004 | Wu et al. |
| 2004/0183829 A1 | 9/2004 | Kontny et al. |
| 2004/0201683 A1 | 10/2004 | Murashita et al. |
| 2004/0203851 A1 | 10/2004 | Vetro et al. |
| 2004/0203909 A1 | 10/2004 | Koster |
| 2004/0209602 A1 | 10/2004 | Joyce et al. |
| 2004/0243623 A1 | 12/2004 | Ozer et al. |
| 2004/0260804 A1 | 12/2004 | Grabarnik et al. |
| 2004/0267880 A1 | 12/2004 | Patiejunas |

| | | |
|---|---|---|
| 2005/0005242 A1 | 1/2005 | Hoyle |
| 2005/0015451 A1 | 1/2005 | Sheldon et al. |
| 2005/0015599 A1 | 1/2005 | Wang et al. |
| 2005/0050027 A1 | 3/2005 | Yeh |
| 2005/0050043 A1 | 3/2005 | Pyhalammi et al. |
| 2005/0055321 A1 | 3/2005 | Fratkina |
| 2005/0060381 A1 | 3/2005 | Huynh et al. |
| 2005/0065950 A1 | 3/2005 | Chaganti et al. |
| 2005/0065980 A1 | 3/2005 | Hyatt et al. |
| 2005/0076060 A1 | 4/2005 | Finn et al. |
| 2005/0086187 A1 | 4/2005 | Grosser et al. |
| 2005/0105552 A1 | 5/2005 | Osterling |
| 2005/0108213 A1 | 5/2005 | Riise et al. |
| 2005/0120006 A1 | 6/2005 | Nye |
| 2005/0131727 A1 | 6/2005 | Sezan et al. |
| 2005/0149397 A1 | 7/2005 | Morgenstern et al. |
| 2005/0151849 A1 | 7/2005 | Fitzhugh et al. |
| 2005/0159220 A1 | 7/2005 | Wilson et al. |
| 2005/0159970 A1 | 7/2005 | Buyukkokten et al. |
| 2005/0160080 A1 | 7/2005 | Dawson |
| 2005/0165699 A1 | 7/2005 | Hahn-Carlson |
| 2005/0166240 A1 | 7/2005 | Kim |
| 2005/0171955 A1 | 8/2005 | Hull et al. |
| 2005/0177385 A1 | 8/2005 | Hull et al. |
| 2005/0182824 A1 | 8/2005 | Cotte |
| 2005/0183110 A1 | 8/2005 | Anderson |
| 2005/0187786 A1 | 8/2005 | Tsai |
| 2005/0192025 A1 | 9/2005 | Kaplan |
| 2005/0203801 A1 | 9/2005 | Morgenstern et al. |
| 2005/0216295 A1 | 9/2005 | Abrahamsohn |
| 2005/0216300 A1 | 9/2005 | Appelman et al. |
| 2005/0219375 A1 | 10/2005 | Hasegawa et al. |
| 2005/0234781 A1 | 10/2005 | Morgenstern |
| 2005/0273510 A1 | 12/2005 | Schuh |
| 2006/0020631 A1 | 1/2006 | Cheong Wan et al. |
| 2006/0026013 A1 | 2/2006 | Kraft |
| 2006/0026067 A1 | 2/2006 | Nicholas et al. |
| 2006/0031108 A1 | 2/2006 | Oran |
| 2006/0040719 A1 | 2/2006 | Plimi |
| 2006/0047563 A1 | 3/2006 | Wardell |
| 2006/0047615 A1 | 3/2006 | Ravin |
| 2006/0053058 A1 | 3/2006 | Hotchkiss et al. |
| 2006/0069612 A1 | 3/2006 | Hurt et al. |
| 2006/0069616 A1 | 3/2006 | Bau |
| 2006/0069749 A1 | 3/2006 | Herz et al. |
| 2006/0074853 A1 | 4/2006 | Liu et al. |
| 2006/0085392 A1 | 4/2006 | Wang et al. |
| 2006/0085419 A1 | 4/2006 | Rosen |
| 2006/0089876 A1 | 4/2006 | Boys |
| 2006/0116924 A1 | 6/2006 | Angeles et al. |
| 2006/0123053 A1 | 6/2006 | Scannell, Jr. |
| 2006/0129313 A1 | 6/2006 | Becker |
| 2006/0129605 A1 | 6/2006 | Doshi |
| 2006/0161894 A1 | 7/2006 | Oustiougov et al. |
| 2006/0168591 A1 | 7/2006 | Hunsinger et al. |
| 2006/0173838 A1 | 8/2006 | Garg et al. |
| 2006/0173985 A1 | 8/2006 | Moore |
| 2006/0178822 A1 | 8/2006 | Lee |
| 2006/0184508 A1 | 8/2006 | Fuselier et al. |
| 2006/0184579 A1 | 8/2006 | Mills |
| 2006/0212330 A1 | 9/2006 | Savilampi |
| 2006/0212401 A1 | 9/2006 | Ameerally et al. |
| 2006/0227945 A1 | 10/2006 | Runge et al. |
| 2006/0235816 A1 | 10/2006 | Yang et al. |
| 2006/0236257 A1 | 10/2006 | Othmer et al. |
| 2006/0242139 A1 | 10/2006 | Butterfield et al. |
| 2006/0242178 A1 | 10/2006 | Butterfield et al. |
| 2006/0242259 A1 | 10/2006 | Vallabh et al. |
| 2006/0258368 A1 | 11/2006 | Granito et al. |
| 2006/0282455 A1 | 12/2006 | Lee |
| 2007/0013560 A1 | 1/2007 | Casey |
| 2007/0015519 A1 | 1/2007 | Casey |
| 2007/0043766 A1 | 2/2007 | Nicholas et al. |
| 2007/0067104 A1 | 3/2007 | Mays |
| 2007/0067267 A1 | 3/2007 | Ives |
| 2007/0072591 A1 | 3/2007 | McGary et al. |
| 2007/0073583 A1 | 3/2007 | Grouf et al. |
| 2007/0073641 A1 | 3/2007 | Perry et al. |
| 2007/0086061 A1 | 4/2007 | Robbins |
| 2007/0087756 A1 | 4/2007 | Hoffberg |
| 2007/0088852 A1 | 4/2007 | Levkovitz |
| 2007/0100956 A1 | 5/2007 | Kumar |
| 2007/0112762 A1 | 5/2007 | Brubaker |
| 2007/0121843 A1 | 5/2007 | Atazky et al. |
| 2007/0130137 A1 | 6/2007 | Oliver et al. |
| 2007/0136048 A1 | 6/2007 | Richardson-Bunbury et al. |
| 2007/0136235 A1 | 6/2007 | Hess |
| 2007/0136256 A1 | 6/2007 | Kapur et al. |
| 2007/0136689 A1 | 6/2007 | Richardson-Bunbury et al. |
| 2007/0143345 A1 | 6/2007 | Jones et al. |
| 2007/0150168 A1 | 6/2007 | Balcom et al. |
| 2007/0150359 A1 | 6/2007 | Lim et al. |
| 2007/0155411 A1 | 7/2007 | Morrison |
| 2007/0161382 A1 | 7/2007 | Melinger et al. |
| 2007/0162850 A1 | 7/2007 | Adler |
| 2007/0168430 A1 | 7/2007 | Brun et al. |
| 2007/0173266 A1 | 7/2007 | Barnes |
| 2007/0179792 A1 | 8/2007 | Kramer |
| 2007/0185599 A1 | 8/2007 | Robinson et al. |
| 2007/0192299 A1 | 8/2007 | Zuckerberg et al. |
| 2007/0198506 A1 | 8/2007 | Attaran Rezaei et al. |
| 2007/0198563 A1 | 8/2007 | Apparao et al. |
| 2007/0203591 A1 | 8/2007 | Bowerman |
| 2007/0219708 A1 | 9/2007 | Brasche et al. |
| 2007/0233585 A1 | 10/2007 | Ben Simon et al. |
| 2007/0239348 A1 | 10/2007 | Cheung |
| 2007/0239517 A1 | 10/2007 | Chung et al. |
| 2007/0259653 A1 | 11/2007 | Tang et al. |
| 2007/0260508 A1 | 11/2007 | Barry et al. |
| 2007/0260604 A1 | 11/2007 | Haeuser et al. |
| 2007/0271297 A1 | 11/2007 | Jaffe et al. |
| 2007/0271340 A1 | 11/2007 | Goodman et al. |
| 2007/0273758 A1 | 11/2007 | Mendoza et al. |
| 2007/0276940 A1 | 11/2007 | Abraham et al. |
| 2007/0282621 A1 | 12/2007 | Altman et al. |
| 2007/0282675 A1 | 12/2007 | Varghese |
| 2007/0288278 A1 | 12/2007 | Alexander et al. |
| 2008/0005313 A1 | 1/2008 | Flake et al. |
| 2008/0005651 A1 | 1/2008 | Grefenstette et al. |
| 2008/0010206 A1 | 1/2008 | Coleman |
| 2008/0021957 A1 | 1/2008 | Medved et al. |
| 2008/0026804 A1 | 1/2008 | Baray et al. |
| 2008/0028031 A1 | 1/2008 | Bailey et al. |
| 2008/0040283 A1 | 2/2008 | Morris |
| 2008/0046298 A1 | 2/2008 | Ben-Yehuda et al. |
| 2008/0070588 A1 | 3/2008 | Morin |
| 2008/0086356 A1 | 4/2008 | Glassman et al. |
| 2008/0086431 A1 | 4/2008 | Robinson et al. |
| 2008/0091796 A1 | 4/2008 | Story et al. |
| 2008/0096664 A1 | 4/2008 | Baray et al. |
| 2008/0102911 A1 | 5/2008 | Campbell et al. |
| 2008/0104061 A1 | 5/2008 | Rezaei |
| 2008/0104227 A1 | 5/2008 | Birnie et al. |
| 2008/0109761 A1 | 5/2008 | Stambaugh |
| 2008/0109843 A1 | 5/2008 | Ullah |
| 2008/0114751 A1 | 5/2008 | Cramer et al. |
| 2008/0120183 A1 | 5/2008 | Park |
| 2008/0120308 A1 | 5/2008 | Martinez et al. |
| 2008/0120690 A1 | 5/2008 | Norlander et al. |
| 2008/0133750 A1 | 6/2008 | Grabarnik et al. |
| 2008/0147655 A1 | 6/2008 | Sinha et al. |
| 2008/0147743 A1 | 6/2008 | Taylor et al. |
| 2008/0148175 A1 | 6/2008 | Naaman et al. |
| 2008/0154720 A1 | 6/2008 | Gounares |
| 2008/0163284 A1 | 7/2008 | Martinez et al. |
| 2008/0172632 A1 | 7/2008 | Stambaugh |
| 2008/0177706 A1 | 7/2008 | Yuen |
| 2008/0270579 A1 | 10/2008 | Herz et al. |
| 2008/0285886 A1 | 11/2008 | Allen |
| 2008/0301250 A1 | 12/2008 | Hardy et al. |
| 2008/0320001 A1 | 12/2008 | Gaddam |
| 2009/0005987 A1 | 1/2009 | Vengroff et al. |
| 2009/0006336 A1 | 1/2009 | Forstall et al. |
| 2009/0012934 A1 | 1/2009 | Yerigan |
| 2009/0012965 A1 | 1/2009 | Franken |
| 2009/0043844 A1 | 2/2009 | Zimmet et al. |
| 2009/0044132 A1 | 2/2009 | Combel et al. |
| 2009/0063254 A1 | 3/2009 | Paul et al. |

| | | | |
|---|---|---|---|
| 2009/0070186 A1 | 3/2009 | Buiten et al. | |
| 2009/0073191 A1 | 3/2009 | Smith et al. | |
| 2009/0076889 A1 | 3/2009 | Jhanji | |
| 2009/0100052 A1 | 4/2009 | Stern et al. | |
| 2009/0106356 A1 | 4/2009 | Brase et al. | |
| 2009/0119255 A1* | 5/2009 | Frank et al. | 707/3 |
| 2009/0125517 A1 | 5/2009 | Krishnaswamy et al. | |
| 2009/0132941 A1 | 5/2009 | Pilskalns et al. | |
| 2009/0144141 A1 | 6/2009 | Dominowska et al. | |
| 2009/0150501 A1 | 6/2009 | Davis et al. | |
| 2009/0150507 A1 | 6/2009 | Davis et al. | |
| 2009/0165051 A1 | 6/2009 | Armaly | |
| 2009/0171939 A1 | 7/2009 | Athsani et al. | |
| 2009/0177603 A1 | 7/2009 | Honisch | |
| 2009/0187637 A1 | 7/2009 | Wu et al. | |
| 2009/0204484 A1 | 8/2009 | Johnson | |
| 2009/0204672 A1 | 8/2009 | Jetha et al. | |
| 2009/0204676 A1 | 8/2009 | Parkinson et al. | |
| 2009/0216606 A1 | 8/2009 | Coffman et al. | |
| 2009/0222302 A1 | 9/2009 | Higgins | |
| 2009/0222303 A1 | 9/2009 | Higgins | |
| 2009/0234814 A1 | 9/2009 | Boerries et al. | |
| 2009/0234909 A1 | 9/2009 | Strandeil et al. | |
| 2009/0249482 A1 | 10/2009 | Sarathy | |
| 2009/0265431 A1 | 10/2009 | Jania et al. | |
| 2009/0281997 A1 | 11/2009 | Jain | |
| 2009/0299837 A1 | 12/2009 | Steelberg et al. | |
| 2009/0313546 A1 | 12/2009 | Katpelly et al. | |
| 2009/0320047 A1 | 12/2009 | Khan et al. | |
| 2009/0323519 A1 | 12/2009 | Pun | |
| 2009/0328087 A1 | 12/2009 | Higgins et al. | |
| 2010/0002635 A1 | 1/2010 | Eklund | |
| 2010/0014444 A1 | 1/2010 | Ghanadan et al. | |
| 2010/0063993 A1 | 3/2010 | Higgins et al. | |
| 2010/0070368 A1 | 3/2010 | Choi et al. | |
| 2010/0118025 A1 | 5/2010 | Smith et al. | |
| 2010/0125563 A1 | 5/2010 | Nair et al. | |
| 2010/0125569 A1 | 5/2010 | Nair et al. | |
| 2010/0125604 A1 | 5/2010 | Martinez et al. | |
| 2010/0125605 A1 | 5/2010 | Nair et al. | |
| 2010/0185642 A1 | 7/2010 | Higgins et al. | |

FOREIGN PATENT DOCUMENTS

| | | |
|---|---|---|
| JP | 2002312559 | 10/2002 |
| KR | 1020000036897 | 7/2000 |
| KR | 1020000054319 | 9/2000 |
| KR | 10-2000-0064105 | 11/2000 |
| KR | 1020030049173 | 6/2003 |
| KR | 10-0801662 | 2/2005 |
| KR | 1020060043333 | 5/2006 |
| KR | 102007034094 | 3/2007 |
| KR | 1020070073180 | 7/2007 |
| KR | 1020080048802 | 6/2008 |
| WO | WO2006/116196 | 11/2006 |
| WO | WO 2007/022137 | 2/2007 |
| WO | WO 2007/027453 | 3/2007 |
| WO | WO 2007070358 | 6/2007 |
| WO | WO2007113546 | 10/2007 |

OTHER PUBLICATIONS

U.S. Appl. No. 11/593,869, filed Nov. 6, 2006 for Naaman, et al.
"Gutenkarte" Book Catalog, 2006 MetaCarta, Inc., www.gutenkarte.org 11 pgs.
Baron, N.S. et al. (Aug. 30, 2005). "Tethered or Mobile? Use of Away Messages in Instant Messaging by American College Students," Chapter 20.1 in Mobile Communication, Springer: London, England, 31:293-297.
Jones, C. et al. (2004). "Ad-Hoc Meeting System," Final Presentation from Project Group #7, SIMS 202, Fall 2004 Class, UC Berkley School of Information Management & Systems, located at <http://www2.sims.berkeley.edu/academics/courses/is202/f04/phone_project/Group7/>, last visited on Feb. 2, 2010, thirteen pages.
Manguy, L. et al. (2006). "iTour—Packing the World Into Your Mobile Device," Final Presentation from Project Group #6, SIMS 202, Fall 2004 Class, UC Berkley School of Information Management &Systems, located at <http://www2.sims.berkeley.edu/academics/courses/is202/f04/phone_project/Group6/index.h > . . . , last visited on Feb. 2, 2010, ten pages.
Mitnick, S. et al. (2004). "Pillbox," Final Presentation from Project Group #8, SIMS: 02: Fall 2004 Class, UC Berkley School of Information Management & Systems, located at <http://www2.sims.berkeley.edu/academics/courses/is202/f04/phone_project/Group8/about.p. . . ,> last visited on Feb. 2, 2010, seventeen pages.
Wooldridge, M. et al. (2005). "STALK. The Camera-phone Scavenger Hunt!" located at <http://www.stalk.com >, last visited on Dec. 28, 2009, two pages.
www.stalk.com (retrieved on Dec. 29, 2009) pp. 1-2.
Anonymous. (Date Unknown). "CommunityWalk—About," located at <http://www.communitywalk.com/about >, last visited on Mar. 3, 2008, one page.
Anonymous. (Date Unknown). "CommunityWalk Mapping Made Easy," located at <http://www.communitywalk.com/>, last visited on Mar. 3, 2008, one page.
Anonymous. (Date Unknown). "Google Earth User Guide" located at <http://earth.google.com/userguide/v4/>, last visited on Feb. 27, 2008, twelve pages.
Anonymous. (Date Unknown). "Google Earth—Wikipedia, the Free Encyclopedia," located at <http://en.wikipedia.org/wiki/Google_earth >, last visited on Mar. 3, 2008, fourteen pages.
Anonymous. (Date Unknown). "Google Maps," located at <http://en.wikipedia.org/wiki/Google_maps >, last visited on Feb. 27, 2008, eleven pages.
Anonymous. (Date Unknown). "Live Search Maps," located at <http://en.wikipedia.org/wiki/Windows_live_maps >, last visited on Mar. 3, 2008, six pages.
Anonymous. (Date Unknown). "WikiMapia," located at <http://en.wikipedia.org/wiki/WikiMapia >, last visited on Mar. 3, 2008, three pages.
Anonymous. (2007). "Ask.com Maps & Directions," located at <http://maps.ask.com/maps >, last visited on Mar. 3, 2008, one page.
Anonymous. (2007). "Wayfaring Follow You, Follow Me," located at <http://www.wayfaring.com/>, last visited on Mar. 3, 2008, three pages.
Anonymous. (2008). "Platial the People's Atlas," located at <www.platial.com >, last visited on Mar. 3, 2008, one page.
Anonymous. (2008). "Wikimpaia.org ," located at <http://wikimpaia.org/>, last visited on Mar. 3, 2008, one page.
Axup, Jeff et al., "Conceptualizing New Mobile Devices By Observing Gossip and Social Network Formation Amongst the Extremely Mobile", ITEE Technical Report #459, Dec. 19, 2005, pp. 1-71.
Conhaim, Wallys W., "Social networks: the Internet continues to evolve: where is the money in all this? That is what venture capitalists are asking. (Perspectives)", Information Today, 22, 9, 35(2), Oct. 2005, (pp. 1-5 of attached).
Davis, Marc et al., "From Context to Content: Leveraging Context to Infer Media Metadata", ACM Press, Oct. 10, 2004, pp. 1-8.
Kaasinen, E., "Behaviour & Information Technology", Taylor & Francis, vol. 24, No. 1, Jan./Feb. 2005, pp. 37-49, (Abstract only attached).
Konomi, Shin'ichi et al., "Supporting Colocated Interactions Using RFID and Social Network Displays", Pervasive Computing, Jul.-Sep. 2006 , vol. 5, No. 3, pp. 48-56 (pp. 1-4 of attached).
Lin, F. et al., "A unified framework for managing Web-based services.", Information Systems and e-Business Management, vol. 3, Oct. 2005, p. 299, (pp. 1-15 of attached).
Metz, Cade, "MySpace Nation", PC Magazine, Jun. 21, 2006, pp. 1-10 attached.
Perkowitz, Mike et al., "Utilizing Online Communities to Facilitate Physical World Interactions", The International Conference on Communities and Technologies, Sep. 19, 2003, Amsterdam, pp. 1 6.
Roush, Wade, "Social Machines", Continuous Computing Blog, Jul. 5, 2005, pp. 1-21.
Roush, Wade, "Social Machines", Technology Review, Aug. 2005, pp. 45-51.
Sheppard, Brett, "The Rights Stuff: The Integration of Enterprise Digital Rights Management Into An Enterprise Architecture", ECantent, vol. 29, No. 9, Nov. 2006, p. 38, 40-44, (pp. 1-7 of attached).
Voight, Joan et al., "Lessons for Today's Digital Market", ADWEEKCOM, Oct. 2, 2006, pp. 1-6.

"Companies add new communication features to photo sharing.", Digital Imaging Digest, Feb. 2006, pp. 1-2.
"Dave.TV and Eye Music Network Empower Users to Create Their Own Music TV Channel on Their Sites With New IPTV Channel", www.davenw.com/2006, Sep. 13, 2006, pp. 1-2.
"Digital rights management: a primer: developing a user-friendly means of protecting content.(Profile)", Screen Digest, No. 420, p. 305, Sep. 2006, (pp. 1-9 of attached).
"Emerging Markets: What media 2.0 can offer advertisers.", Campaign, Oct. 27, 2006, p. 26, (pp. 1-5 of attached).
"Reality Digital Debuts Opus", www.lightreading.com. Sep. 25, 2006, pp. 1.
"Reality Digital—Making Media Move", www.realitydigital.com, Nov. 28, 2006, pp. 1-2.
Nedos, A; Singh K., Clarke S, Proximity Based Group Communications for Mobile Ad Hoc Networks; Proximity-Based Group Communication; Global Smart Spaces; D.14; Oct. 3, 2003; 31 pages.
Brunato, M; Battiti R. "Pilgrim: A Location Broker and Mobility-Aware Recommendation System"; Technical report DIT-02-0092, Universita di Trento, Oct. 2002; 8 pages.
Backstrom et al., Spatial Variation in Search Engine Queries, WWW•2008, Beijing, China (Apr. 21-25, 2008).
Gan et al., Analysis of Geographic Queries in a Search Engine Log, LocWeb 2008, Beijing, China (Apr. 22, 2008).
Jones et al., Geographic Intention and Modification in Web Search, International Journal of Geographical Information Science, vol. 22, No. 3, pp. 1-20 (Jul. 2008).
Sanderson et al., Analyzing Geographic Queries; Department of Information Studies; University of Sheffield, UK; 2 pages.
Go With the Flow, The Economist Technology Quarterly, vol. 382, Issue 8519, 4 pages, (Mar. 10, 2007).
International Search Report and Written Opinion (PCT/US2009/060476) dated May 4, 2010; 12 pages.
International Search Report and Written Opinion (PCT/US2009/060374) dated Apr. 30, 2010; 12 pages.
International Search Report (PCT/US2009/060379) dated Apr. 30, 2010; 3 pages.
International Search Report and Written Opinion (PCT/US2008/085135) dated May 25, 2009; 7 pages.
International Search Report (PCT/US2009/055503) dated Apr. 8, 2010; 3 pages.
Written Opinion (PCT/US2008/085915) dated Jun. 29, 2009; 4 pages.
Written Opinion (PCT/US2008/086948) dated May 21, 2009; 5 pages.
International Search Report and Written Opinion (PCT/US2009/051247) dated Jan. 25, 2010; 9 pages.
International Search Report and Written Opinion (PCT/US2009/046258) dated Dec. 23, 2009; 7 pages.
U.S. Appl. No. 12/409,867, filed Mar. 24, 2009, King.
U.S. Appl. No. 12/540,098, filed Aug. 12, 2009, Martinez.
U.S. Appl. No. 12/536,892, filed Aug. 6, 2009, King.
U.S. Appl. No. 12/540,588, filed Aug. 13, 2009, Tendjoukian.
U.S. Appl. No. 12/015,115, filed Jan. 16, 2006, Higgins.
U.S. Appl. No. 12/180,486, filed Jul. 25, 2008, Higgins.
U.S. Appl. No. 12/180,499, filed Jul. 25, 2008, Higgins.
U.S. Appl. No. 12/015,146, filed Jan. 16, 2008, Higgins.
U.S. Appl. No. 12/041,088, filed Mar. 3, 2008, Higgins.
U.S. Appl. No. 12/041,062, filed Mar. 3, 3008, Higgins.
U.S. Appl. No. 12/041,054, filed Mar. 3, 2008, Higgins.
U.S. Appl. No. 12/540,269, filed Aug. 12, 2009, Kalaboukis.
U.S. Appl. No. 11/969,815, filed Jan. 4, 2004, Davis.
U.S. Appl. No. 12/182,111, filed Jul. 29, 2008, Davis.
U.S. Appl. No. 12/434,575, filed May 1, 2009, O'Sullivan.
U.S. Appl. No. 12/434,580, filed May 1, 2009, O'Sullivan.
U.S. Appl. No. 12/407,690, filed Mar. 19, 2009, Davis.
U.S. Appl. No. 12/407,681, filed Mar. 19, 2009, Athsani.
International Search Report (PCT/US2009/030405) dated Sep. 23, 2009; 2 pages.
U.S. Appl. No. 12/041,054 file history dated Mar. 3, 2008; 64 pgs.
U.S. Appl. No. 12/041,062 file history dated Mar. 3, 2008; 66 pgs.
U.S. Appl. No. 12/041,088 file history dated Mar. 3, 2008; 66 pgs.
U.S. Appl. No. 12/169,931 file history dated Jul. 9, 2008; 66 pgs.
U.S. Appl. No. 12/170,025 file history dated Jul. 9, 2008; 67 pgs.
U.S. Appl. No. 12/180,499 file history dated Jul. 25, 2008; 67 pgs.
U.S. Appl. No. 12/180,486 file history dated Jul. 25, 2008; 65 pgs.
International Search Report PCT/US2009/030406 dated Sep. 29, 2009; 5 pages.
International Search Report and Written Opinion PCT/US2009/034445 dated Oct. 12, 2009; 7 pages.
Office Action U.S. Appl. No. 12/041,054 dated Oct. 27, 2010; 15 pages.
Office Action U.S. Appl. No. 12/041,062 dated Oct. 28, 2010; 12 pages.
International Search Report PCT/US2009/034444 dated Sep. 18, 2009; 2 pages.
Office Action U.S. Appl. No. 12/041,088 dated Oct. 4, 2010; 18 pages.
Almieda, R.B. et al. "A Community-Aware Search Engine," WWW2004, New York., NY, May 17-22, 2004, pp. 413-421.
Anonymous. (Jul. 16, 2006). MyFantasyLeague Fantasy Football League Management—Features, located at <http://web.archive.org/web/20060716072900/www.myfantasyleague.com/features.htm >, last visited on Feb. 10, 2009, four pages.
Anonymous. (Jul. 17, 2006). "Fantasy Football Lineup Analyzer—Tips for Who to Start & Who to Bench each Week," located at http://web.archive.org/web/200607171633529/www.fantasyfootballstarters.com/lineupAnalyzer.jsp>, last visited on Feb. 10, 2009, one page.
Bharat, K. (Date Unknown). "SearchPad: Explicit Capture of Search Context to Support Web Search," located at <http://www9.org/w9cdrom/173/173.html >, last visited Aug. 1, 2007, 13 pages.
Budzik, J. et al. (2000). "User Interactions with Everyday Applications as Context for Just-in-Time Information Access," Proceeding of the 2000 Conference on Intelligent User Interfaces, eight pages.
Finkelstein, L. et al. (2001). "Placing Search in Context: The Concept Revisited," WWW/O, Hong Kong, May 2-5, 2001, pp. 406-414.
Freyne, J. et al. (2004). "Further Experiments on Collaborative Ranking in Community-Based Web Search," Artificial Intelligence Review, pp. 1-23.
Lieberman, H. (1995) "Letizia: An Agent that Assists Web Browsing," Proceedings of the Fourteenth International Joint Conference on Artificial Intelligence, Aug. 20-25, 1995, six pages.
Mitra, M. et al. (1998). "Improving Automatic Query Expansion," Proceedings of the AMC SIGIR, nine pages.
Rhodes, B.J. et al. (1996). "Remembrance Agent: A Continuously Running Automated Information Retrieval System," Proceedings of the First International Conference on the Practical Application of Intelligent Agents and Multi Agent Technology (PAAM), pp. 487-495, located at <http://www.cc.gatech.edu/fac/Thad.Starner/p/032_40_agents&ubicomp/remembrance-agent . . . >, last visited Aug. 1, 2007, six pages.
Sansbury, C. (Sep. 13, 2005). "Yahoo! Widget for BBC Sports News—Scotland," 32. located at <http://widgets.yahoo.com/gallery/view.php?widget=37220 >, last visited on Feb. 7, 2007, one page.
Yahoo! Inc. (Dec. 7, 2005). "Yahoo! Widget Engine 3.0 Reference Manual Version 3.0," 300 pages.
U.S. Appl. No. 12/407,690, filed Mar. 19, 2009; 50 pages.
U.S. Appl. No. 12/407,681, filed Mar. 19, 2009; 56 pages.
International Search Report PCT/US2008/088228 dated Sep. 30, 2009—2 pages.
Written Opinion PCT/US2008/088228 dated Sep. 30, 2009—5 pages.
U.S. Appl. No. 11/617,451, filed Dec. 28, 2006, Kalaboukis.
U.S. Appl. No. 11/562,973, filed Nov. 22, 2006, Martinez.
U.S. Appl. No. 11/562,974, filed Nov. 22, 2006, Martinez.
U.S. Appl. No. 11/562,976, filed Nov. 22, 2006, Martinez.
U.S. Appl. No. 11/562,979, filed Nov. 22, 2006, Martinez.
U.S. Appl. No. 12/237,709, filed Sep. 25, 2008, Martinez.
U.S. Appl. No. 12/399,669, filed Mar. 6, 2009, King.
U.S. Appl. No. 11/353,657, filed Feb. 13, 2006, Mor Naaman.
U.S. Appl. No. 11/437,344, filed May 19, 2006, Jaffe.
U.S. Appl. No. 11/593,869, filed Nov. 6, 2006, Mor Naaman.
U.S. Appl. No. 11/593,668, filed Nov. 6, 2006, Mor Naaman.

Allen James F., "Maintaining Knowledge About Temporal Intervals", Communications of the ACM, Nov. 1983, vol. 26, No. 11 pp. 832-843; 12 pages.

Press Release, "QUALCOMM Conducts First Live Demonstration of FL Technology On a Wireless Handset", Qualcomm Inc., San Diego, Sep. 27, 2005; 3 pages.

MediaFlo, FLO Technology Overview, Qualcomm Inc. Copyright 2007; 24 pages.

Notification of Transmittal of The International Search Report and The Written Opinion of The International Search Authority, Or Declaration (PCT/US2007/'084797) dated Mar. 21, 2008; 11 pages.

International Search Report (PCT/US2007/084807) dated May 27, 2008; 3 pages.

International Preliminary Report on Patentability (PCT/US2007/084807) dated May 26, 2009; 5 pages.

International Search Report (PCT/US2010/026063) dated May 27, 2008; 3 pages.

Rekimoto, et al., "CyberCode: designing augmented reality environments with visual tags. "Proceedings of DARE 2000 on Designing augmented reality environments, Elsinore, Denmark, pp. 1-11 Apr. 12-14, 2000.

"Semacode-URL Barcodes-practical ubiquitous computing", located at http://semacode.org visited on Apr. 13, 2007; 3 pages.

"Technical White Paper: Choosing the best 2D barcode format for mobile apps,"Semacode, Jul. 15, 2006; pp. 1-7 located at http://semacode.org/about/technical/whitepaper/best$2_2$d$_{13}$ code.pdf.

Carbonell, J. et al. (Aug. 24-28, 1998). "The Use of MMR, Diversity-Based Reranking for Reordering Documents and Producing Summaries," SIGIR '98: Proceedings of the 21 S Annual International ACM SIGIR Conference on Research and Development in Information Retrieval: Melbourne, Australia W.B. Croft et al. eds., pp. 335-336.

Cooper, M. et al. (Nov. 2-8, 2003). "Temporal Event Clustering for Digital Photo Collections," MM'03 Berkeley, California, pp. 364-373.

Davis, M. et al. (Oct. 10-16, 2004). "From Context to Content: Leveraging Context to Infer Media Metadata," MM'04 New York, New York. 9 pages.

Davis, M. et al. "From Context to Content: Leveraging Context for Mobile Media Metadata." 9 pages.

Davis. M. et al. (Apr. 2-7, 2005). "MMM2: Mobile Media Metadata for Media Sharing," CHI 2005 Portland, Oregon. 4 pages.

Davis, M. et al. "Mobile Media Metadata for Mobile Imaging." Jun. 27-30, 2004; 4 pages.

Davis, M. et al. "Using Context and Similarity for Face and Location Identification."10 pages.

Flickr. Welcome to Flickr—Photo Sharing, located at <http://www.flickr.com > visited on Feb. 26, 2007, one page.

Gargi, U. (Aug. 7, 2003). "Consumer Media Capture: Time-Based Analysis and Event Clustering," Technical Report HPL-2003-165 HP Laboratories Palo Alto, pp. 1-15.

Goldberger, J. et al. The Hungarian Clustering Method, located at <http://scholar.googles.com/scholar?num=20&h1=en&lr=&9=cache:vbwsIsm1CisJ:www.openu . acil/Personal_sites/tarnirtassa/Publications/hcm.
pdf+goldberger+clustering+method+hungarian> visited on Mar. 1, 2007, twelve pages.

Graham, A. et al. (Jul. 13-17, 2002). Time as Essence for Photo Browsing Through Personal Digital Libraries, '02 Portland, Oregon. 11 pages.

Jaffe, A. et al. (May 23-26, 2006). "Generating Summaries for Large Collections of Geo-Referenced Photographs," WWW 2006 Edinburgh, Scotland. 2 pages.

Jaffe, A. et al. (Oct. 26-27, 2006). "Generating Summaries and Visualization for Large Collections of Geo-Referenced Photographs," MIR '06 Santa Barbara, California. 11 pages.

Joshi, D. et al. (Oct. 15-16, 2004). "The Story Picturing Engine: Finding Elite Images to Illustrate a Story Using Miitual Reinforcement," MIR '04 New York, New York. 9 pages.

Naaman, M. et al. (Nov. 2003). "From Where to What: Metadata Sharing for Digital Photographs with Geographic Coordinates," In On the Move to Meaningful Internet Systems 2003: Coop/S, DOA, and Odbase R. Meersman et al. eds., pp. 196-217.

Naaman, M. et al. (Jun. 7-11, 2004). "Automatic Organization for Digital Photographs with Geographic Coordinates" Proceedings of the Fourth ACM/IEEE Joint Conference on Digital Libraries Global Reach and Diverse Impact: Tucson, Arizona, pp. 53-62.

Nair, R. et al. (Nov. 6-11, 2005). "Photo L01: Browsing Multi-User Photo Collections," MM'05 Singapore, pp. 223-224.

0' Hare, N. et al. "Combination of Content Analysis and Context Features for Digital Photograph Retrieval." 7 pages.

Pigeau, A. et al. (Jun. 17, 2005). "Organizing a Personal Image Collection with Statistical Model-Based ICL Clustering on Spatio-Temporal Camera Phone Meta-Data." 25 pages.

Sarves, R. et al. (Jun. 6-9, 2004). "Metadata Creation System for Mobile Images," MobiSys'04 Boiton, Massachusetts, pp. 36-48.

Toyama, K. et al. (Nov. 2-8, 2003). "Geographic Location Tags on Digital Images," MM '03'Berkeley: California. 12 pages.

U.S. Appl. No. 12/273,259, filed Dec. 6, 2007, Davis.
U.S. Appl. No. 11/958,157, filed Dec. 17, 2007, Hayashi.
U.S. Appl. No. 11/952,875, filed Dec. 7, 2007, Davis.
U.S. Appl. No. 11/960,368, filed Dec. 19, 2007, Madsen.
U.S. Appl. No. 11/952,007, filed Dec. 6, 2007, Davis.
U.S. Appl. No. 11/953,454, filed Dec. 10, 2007, Davis.
U.S. Appl. No. 11/953,494, filed Dec. 10, 2007, Davis.
U.S. Appl. No. 12/059,594, filed Mar. 31, 2008, Martinez.
U.S. Appl. No. 12/236,668, filed Sep. 24, 2008, Davis.
U.S. Appl. No. 12/057,943, filed Mar. 28, 2008, Martinez.
U.S. Appl. No. 12/057,878, filed Mar. 28, 2008, Martinez.
U.S. Appl. No. 11/969,751, filed Jan. 4, 2008, Martinez.
U.S. Appl. No. 12/163,249, filed Jun. 27, 2008, Kalaboukis.
U.S. Appl. No. 12/145,145, filed Jun. 24, 2008, Davis.
U.S. Appl. No. 12/182,813, filed Jul. 30, 2008, Higgins.
U.S. Appl. No. 12/182,969, filed Jun. 27, 2008, Higgins.
U.S. Appl. No. 12/163,314, filed Jun. 27, 2008, Higgins.
U.S. Appl. No. 12/163,396, filed Jun. 27, 2008, Higgins.
U.S. Appl. No. 12/195,969, filed Aug. 21, 2008, Martinez.
U.S. Appl. No. 12/234,000, filed Sep. 19, 2008, Martinez.
U.S. Appl. No. 12/241,687, filed Sep. 30, 2008, Davis.
U.S. Appl. No. 12/206,172, filed Sep. 8, 2008, Higgins.
U.S. Appl. No. 12/273,291, filed Nov. 18, 2008, Nair.
U.S. Appl. No. 12/273,317, filed Nov. 18, 2008, Nair.
U.S. Appl. No. 12/273,345, filed Nov. 18, 2008, Nair.
U.S. Appl. No. 12/273,371, filed Nov. 18, 2008, Nair.
U.S. Appl. No. 12/241,198, filed Sep. 30, 2008, Higgins.
U.S. Appl. No. 12/339,355, filed Dec. 19, 2008, Higgins.
U.S. Appl. No. 12/329,038, filed Dec. 5, 2008, Higgins.
U.S. Appl. No. 12/326,553, filed Dec. 2, 2008, Churchill.
U.S. Appl. No. 12/242,656, filed Sep. 30, 2008, Burgener.
U.S. Appl. No. 12/357,311, filed Jan. 21, 2009, Higgins.
U.S. Appl. No. 12/357,332, filed Jan. 21, 2009, Higgins.
U.S. Appl. No. 12/357,345, filed Jan. 21, 2009, Higgins.
U.S. Appl. No. 12/357,285, filed Jan. 21, 2009, Higgins.

Anonymous. (Date Unknown). "Google Earth User Guide—Using Image Overlays and 3D Models," located at <http://earth.google.com/userguide/v4/ug_imageoverlays.html >, Feb. 27 2008; nine pages.

* cited by examiner

SYSTEM AND METHOD FOR CONTEXT ENHANCED MAPPING WITHIN A USER INTERFACE

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE DISCLOSURE

The present disclosure relates to systems and methods for displaying a map on a network and, more particularly, to systems and methods for displaying maps in a User Interface which are enhanced using, in part, data collected and stored by multiple devices on a network.

BACKGROUND

A great deal of information is generated when people use electronic devices, such as when people use mobile phones and cable set-top boxes. Such information, such as location, applications used, social network, physical and online locations visited, to name a few, could be used to deliver useful services and information to end users, and provide commercial opportunities to advertisers and retailers. However, most of this information is effectively abandoned due to deficiencies in the way such information can be captured. For example, and with respect to a mobile phone, information is generally not gathered while the mobile phone is idle (i.e., not being used by a user). Other information, such as presence of others in the immediate vicinity, time and frequency of messages to other users, and activities of a user's social network are also not captured effectively.

SUMMARY

In one embodiment, the disclosure is directed to a user interface visibly displayed on a computing device, comprising: a first portion comprising a map of a region, the map comprising a visible indication of an identified location; and a second portion comprising a plurality of media representing, at least in part, spatial, temporal, topical, and social data available to a network and associated with the location, and based on at least one provided criteria associated with the location; wherein each of the plurality of media are user interactive to enable retrieval of additional spatial, temporal, topical, and social data associated with a selected media.

According to some embodiments, the disclosure also includes a user interface comprising a third portion, the third portion comprising the additional spatial, temporal, topical, and social data associated with a selected media, the third portion is at least partially overlapping of at least one of the first portion and the second portion.

In another embodiment, the disclosure is directed to a generating a first portion comprising a map of a region, the map comprising a visible indication of an identified location; and generating a second portion comprising a plurality of media based at least in part on spatial, temporal, topical, and social data available to a network and associated with the location, and based on at least one provided criteria associated with the location; wherein each of the plurality of media are user interactive to enable retrieval of additional spatial, temporal, topical, and social data associated with a selected media.

BRIEF DESCRIPTION OF THE DRAWINGS

The foregoing and other objects, features, and advantages of the disclosure will be apparent from the following more particular description of preferred embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION

Figure 1:
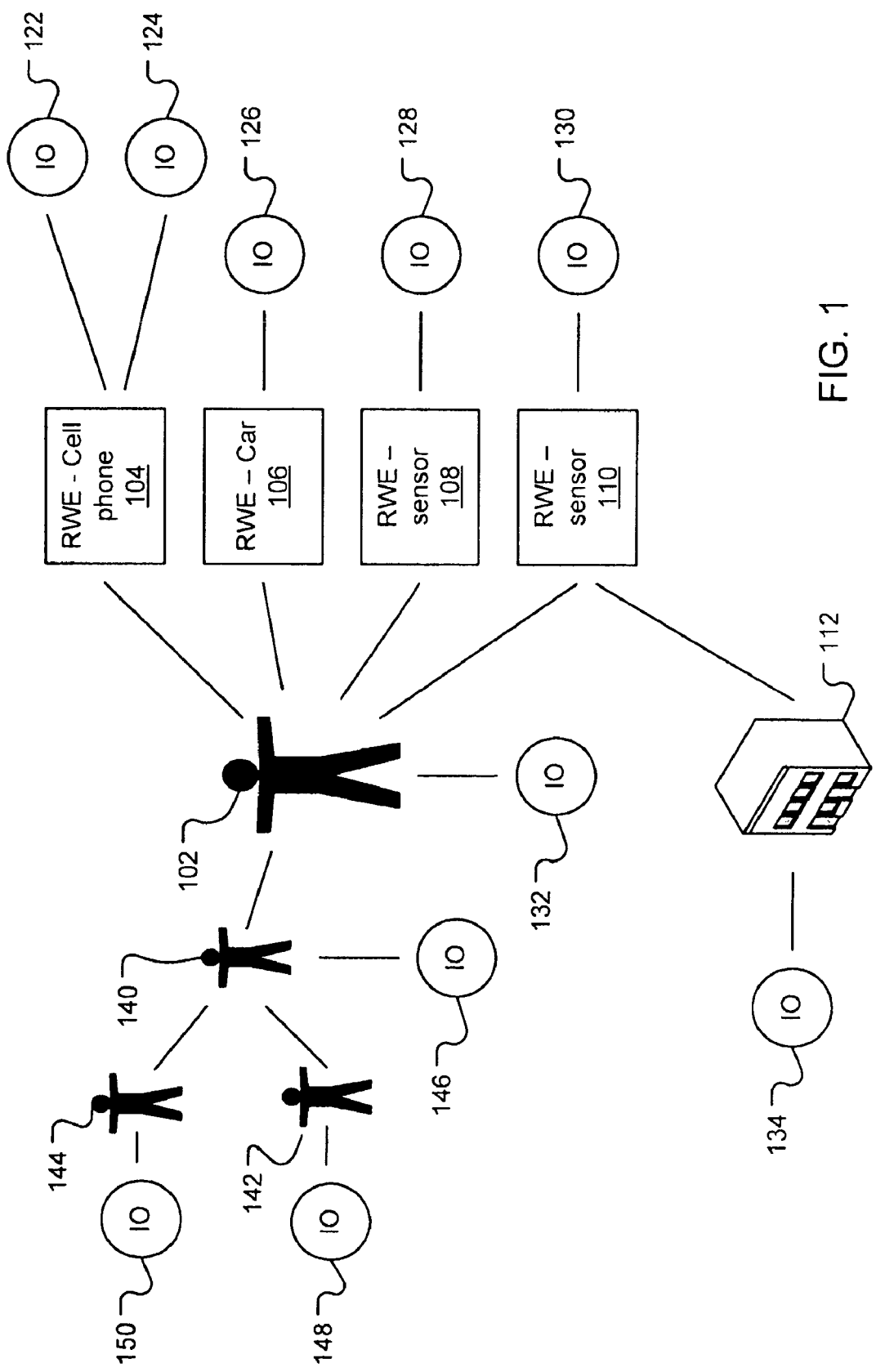
FIG. 1 illustrates relationships between real-world entities (RWE) and information objects (IO) on one embodiment of a W4 Communications Network (W4 COMN.)

The present disclosure is described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions.

These computer program instructions can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and applications software which support the services provided by the server.

For the purposes of this disclosure, the term "end user" or "user" should be understood to refer to a consumer of data supplied by a data provider. By way of example, and not limitation, the term "end user" can refer to a person who receives data provided by the data provider over the Internet in a browser session, or can refer to an automated software application which receives the data and stores or processes the data.

For the purposes of this disclosure, the term "media" and "media content" should be understood to refer to binary data which contains content which can be of interest to an end user. By way of example, and not limitation, the term "media" and "media content" can refer to multimedia data, such as video data or audio data, or any other form of data capable of being transformed into a form perceivable by an end user. Such data can, furthermore, be encoded in any manner currently known, or which can be developed in the future, for specific purposes. By way of example, and not limitation, the data can be encrypted, compressed, and/or can contained embedded metadata.

For the purposes of this disclosure, a computer readable medium is a medium that stores computer data in machine readable form. By way of example, and not limitation, a computer readable medium can comprise computer storage media as well as communication media, methods or signals. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology; CD-ROM, DVD, or other optical storage; cassettes, tape, disk, or other magnetic storage devices; or any other medium which can be used to tangibly store the desired information and which can be accessed by the computer. Illustrative embodiments of the disclosure relate to an arrangement for a user to plan an optimal bus route for traveling to a desired destination by taking into account not only which bus arrives at the station first, but also how far the user has to walk from the user location to a particular bus' station (all possible buses in the neighborhood may not stop at the same place).

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may be grouped into an engine or an application.

Embodiments of the present disclosure utilize information provided by a network which is capable of providing data collected and stored by multiple devices on a network. Such information may include, without limitation, temporal information, spatial information, and user information relating to a specific user or hardware device. User information may include, without limitation, user demographics, user preferences, user social networks, and user behavior. One embodiment of such a network is a W4 Communications Network.

A "W4 Communications Network" or W4 COMN, provides information related to the "Who, What, When and Where" of interactions within the network. In one embodiment, the W4 COMN is a collection of users, devices and processes that foster both synchronous and asynchronous communications between users and their proxies providing an instrumented network of sensors providing data recognition and collection in real-world environments about any subject, location, user or combination thereof.

In one embodiment, the W4 COMN can handle the routing/ addressing, scheduling, filtering, prioritization, replying, forwarding, storing, deleting, privacy, transacting, triggering of a new message, propagating changes, transcoding and linking. Furthermore, these actions can be performed on any communication channel accessible by the W4 COMN.

In one embodiment, the W4 COMN uses a data modeling strategy for creating profiles for not only users and locations, but also any device on the network and any kind of user-defined data with user-specified conditions. Using Social, Spatial, Temporal and Logical data available about a specific user, topic or logical data object, every entity known to the W4 COMN can be mapped and represented against all other known entities and data objects in order to create both a micro graph for every entity as well as a global graph that relates all known entities with one another. In one embodiment, such relationships between entities and data objects are stored in a global index within the W4 COMN.

In one embodiment, a W4 COMN network relates to what may be termed "real-world entities", hereinafter referred to as RWEs. A RWE refers to, without limitation, a person, device, location, or other physical thing known to a W4 COMN. In one embodiment, each RWE known to a W4 COMN is assigned a unique W4 identification number that identifies the RWE within the W4 COMN.

RWEs can interact with the network directly or through proxies, which can themselves be RWEs. Examples of RWEs that interact directly with the W4 COMN include any device such as a sensor, motor, or other piece of hardware connected to the W4 COMN in order to receive or transmit data or control signals. RWE may include all devices that can serve as network nodes or generate, request and/or consume data in a networked environment or that can be controlled through a network. Such devices include any kind of "dumb" device purpose-designed to interact with a network (e.g., cell phones, cable television set top boxes, fax machines, telephones, and radio frequency identification (RFID) tags, sensors, etc.).

Examples of RWEs that may use proxies to interact with W4 COMN network include non-electronic entities including physical entities, such as people, locations (e.g., states, cities, houses, buildings, airports, roads, etc.) and things (e.g., animals, pets, livestock, gardens, physical objects, cars, airplanes, works of art, etc.), and intangible entities such as business entities, legal entities, groups of people or sports teams. In addition, "smart" devices (e.g., computing devices such as smart phones, smart set top boxes, smart cars that support communication with other devices or networks, laptop computers, personal computers, server computers, satellites, etc.) may be considered RWE that use proxies to interact with the network, where software applications executing on the device that serve as the devices' proxies.

In one embodiment, a W4 COMN may allow associations between RWEs to be determined and tracked. For example, a given user (an RWE) can be associated with any number and type of other RWEs including other people, cell phones, smart credit cards, personal data assistants, email and other communication service accounts, networked computers, smart appliances, set top boxes and receivers for cable television and other media services, and any other networked device. This association can be made explicitly by the user, such as when the RWE is installed into the W4 COMN.

An example of this is the set up of a new cell phone, cable television service or email account in which a user explicitly identifies an RWE (e.g., the user's phone for the cell phone service, the user's set top box and/or a location for cable service, or a username and password for the online service) as being directly associated with the user. This explicit association can include the user identifying a specific relationship between the user and the RWE (e.g., this is my device, this is my home appliance, this person is my friend/father/son/etc., this device is shared between me and other users, etc.). RWEs can also be implicitly associated with a user based on a current situation. For example, a weather sensor on the W4 COMN can be implicitly associated with a user based on information indicating that the user lives or is passing near the sensor's location.

In one embodiment, a W4 COMN network may additionally include what may be termed "information-objects", hereinafter referred to as IOs. An information object (IO) is a logical object that may store, maintain, generate or otherwise provides data for use by RWEs and/or the W4 COMN. In one embodiment, data within in an IO can be revised by the act of an RWE An IO within in a W4 COMN can be provided a unique W4 identification number that identifies the IO within the W4 COMN.

In one embodiment, IOs include passive objects such as communication signals (e.g., digital and analog telephone signals, streaming media and interprocess communications), email messages, transaction records, virtual cards, event records (e.g., a data file identifying a time, possibly in combination with one or more RWEs such as users and locations, that can further be associated with a known topic/activity/ significance such as a concert, rally, meeting, sporting event, etc.), recordings of phone calls, calendar entries, web pages, database entries, electronic media objects (e.g., media files containing songs, videos, pictures, images, audio messages, phone calls, etc.), electronic files and associated metadata.

In one embodiment, IOs include any executing process or application that consumes or generates data such as an email communication application (such as OUTLOOK by MICROSOFT, or YAHOO! MAIL by YAHOO!), a calendaring application, a word processing application, an image editing application, a media player application, a weather monitoring application, a browser application and a web page server application. Such active IOs can or can not serve as a proxy for one or more RWEs. For example, voice communication software on a smart phone can serve as the proxy for both the smart phone and for the owner of the smart phone.

In one embodiment, for every IO there are at least three classes of associated RWEs. The first is the RWE that owns or controls the IO, whether as the creator or a rights holder (e.g., an RWE with editing rights or use rights to the TO). The second is the RWE(s) that the IO relates to, for example by containing information about the RWE or that identifies the RWE. The third are any RWEs that access the IO in order to obtain data from the IO for some purpose.

Within the context of a W4 COMN, "available data" and "W4 data" means data that exists in an IO or data that can be collected from a known IO or RWE such as a deployed sensor. Within the context of a W4 COMN, "sensor" means any source of W4 data including PCs, phones, portable PCs or other wireless devices, household devices, cars, appliances, security scanners, video surveillance, RFID tags in clothes, products and locations, online data or any other source of information about a real-world user/topic/thing (RWE) or logic-based agent/process/topic/thing (IO).

FIG. 1 illustrates one embodiment of relationships between RWEs and IOs on a W4 COMN. A user 102 is a RWE provided with a unique network ID. The user 102 may be a human that communicates with the network using proxy devices 104, 106, 108, 110 associated with the user 102, all of which are RWEs having a unique network ID. These proxies can communicate directly with the W4 COMN or can communicate with the W4 COMN using IOs such as applications executed on or by a proxy device.

In one embodiment, the proxy devices 104, 106, 108, 110 can be explicitly associated with the user 102. For example, one device 104 can be a smart phone connected by a cellular service provider to the network and another device 106 can be a smart vehicle that is connected to the network. Other devices can be implicitly associated with the user 102.

For example, one device 108 can be a "dumb" weather sensor at a location matching the current location of the user's cell phone 104, and thus implicitly associated with the user 102 while the two RWEs 104, 108 are co-located. Another implicitly associated device 110 can be a sensor 110 for physical location 112 known to the W4 COMN. The location 112 is known, either explicitly (through a user-designated relationship, e.g., this is my home, place of employment, parent, etc.) or implicitly (the user 102 is often co-located with the RWE 112 as evidenced by data from the sensor 110 at that location 112), to be associated with the first user 102.

The user 102 can be directly associated with one or more persons 140, and indirectly associated with still more persons 142, 144 through a chain of direct associations. Such associations can be explicit (e.g., the user 102 can have identified the associated person 140 as his/her father, or can have identified the person 140 as a member of the user's social network) or implicit (e.g., they share the same address). Tracking the associations between people (and other RWEs as well)

allows the creation of the concept of "intimacy", where intimacy may be defined as a measure of the degree of association between two people or RWEs. For example, each degree of removal between RWEs can be considered a lower level of intimacy, and assigned lower intimacy score. Intimacy can be based solely on explicit social data or can be expanded to include all W4 data including spatial data and temporal data.

In one embodiment, each RWE 102, 104, 106, 108, 110, 112, 140, 142, 144 of a W4 COMN can be associated with one or more IOs as shown. FIG. 1 illustrates two IOs 122, 124 as associated with the cell phone device 104. One IO 122 can be a passive data object such as an event record that is used by scheduling/calendaring software on the cell phone, a contact IO used by an address book application, a historical record of a transaction made using the device 104 or a copy of a message sent from the device 104. The other IO 124 can be an active software process or application that serves as the device's proxy to the W4 COMN by transmitting or receiving data via the W4 COMN. Voice communication software, scheduling/calendaring software, an address book application or a text messaging application are all examples of IOs that can communicate with other IOs and RWEs on the network. IOs may additionally relate to topics of interest to one or more RWEs, such topics including, without limitation, musical artists, genre of music, a location and so forth.

The IOs 122, 124 can be locally stored on the device 104 or stored remotely on some node or datastore accessible to the W4 COMN, such as a message server or cell phone service datacenter. The IO 126 associated with the vehicle 108 can be an electronic file containing the specifications and/or current status of the vehicle 108, such as make, model, identification number, current location, current speed, current condition, current owner, etc. The IO 128 associated with sensor 108 can identify the current state of the subject(s) monitored by the sensor 108, such as current weather or current traffic. The IO 130 associated with the cell phone 110 can be information in a database identifying recent calls or the amount of charges on the current bill.

RWEs which can only interact with the W4 COMN through proxies, such as people 102, 140, 142, 144, computing devices 104, 106 and locations 112, can have one or more IOs 132, 134, 146, 148, 150 directly associated with them which contain RWE-specific information for the associated RWE. For example, IOs associated with a person 132, 146, 148, 150 can include a user profile containing email addresses, telephone numbers, physical addresses, user preferences, identification of devices and other RWEs associated with the user. The IOs may additionally include records of the user's past interactions with other RWE's on the W4 COMN (e.g., transaction records, copies of messages, listings of time and location combinations recording the user's whereabouts in the past), the unique W4 COMN identifier for the location and/or any relationship information (e.g., explicit user-designations of the user's relationships with relatives, employers, co-workers, neighbors, service providers, etc.).

Another example of IOs associated with a person 132, 146, 148, 150 includes remote applications through which a person can communicate with the W4 COMN such as an account with a web-based email service such as Yahoo! Mail. A location's IO 134 can contain information such as the exact coordinates of the location, driving directions to the location, a classification of the location (residence, place of business, public, nonpublic, etc.), information about the services or products that can be obtained at the location, the unique W4 COMN identifier for the location, businesses located at the location, photographs of the location, etc.

In one embodiment, RWEs and IOs are correlated to identify relationships between them. RWEs and IOs may be correlated using metadata. For example, if an IO is a music file, metadata for the file can include data identifying the artist, song, etc., album art, and the format of the music data. This metadata can be stored as part of the music file or in one or more different IOs that are associated with the music file or both. W4 metadata can additionally include the owner of the music file and the rights the owner has in the music file. As another example, if the IO is a picture taken by an electronic camera, the picture can include in addition to the primary image data from which an image can be created on a display, metadata identifying when the picture was taken, where the camera was when the picture was taken, what camera took the picture, who, if anyone, is associated (e.g., designated as the camera's owner) with the camera, and who and what are the subjects of/in the picture. The W4 COMN uses all the available metadata in order to identify implicit and explicit associations between entities and data objects.

Figure 2:
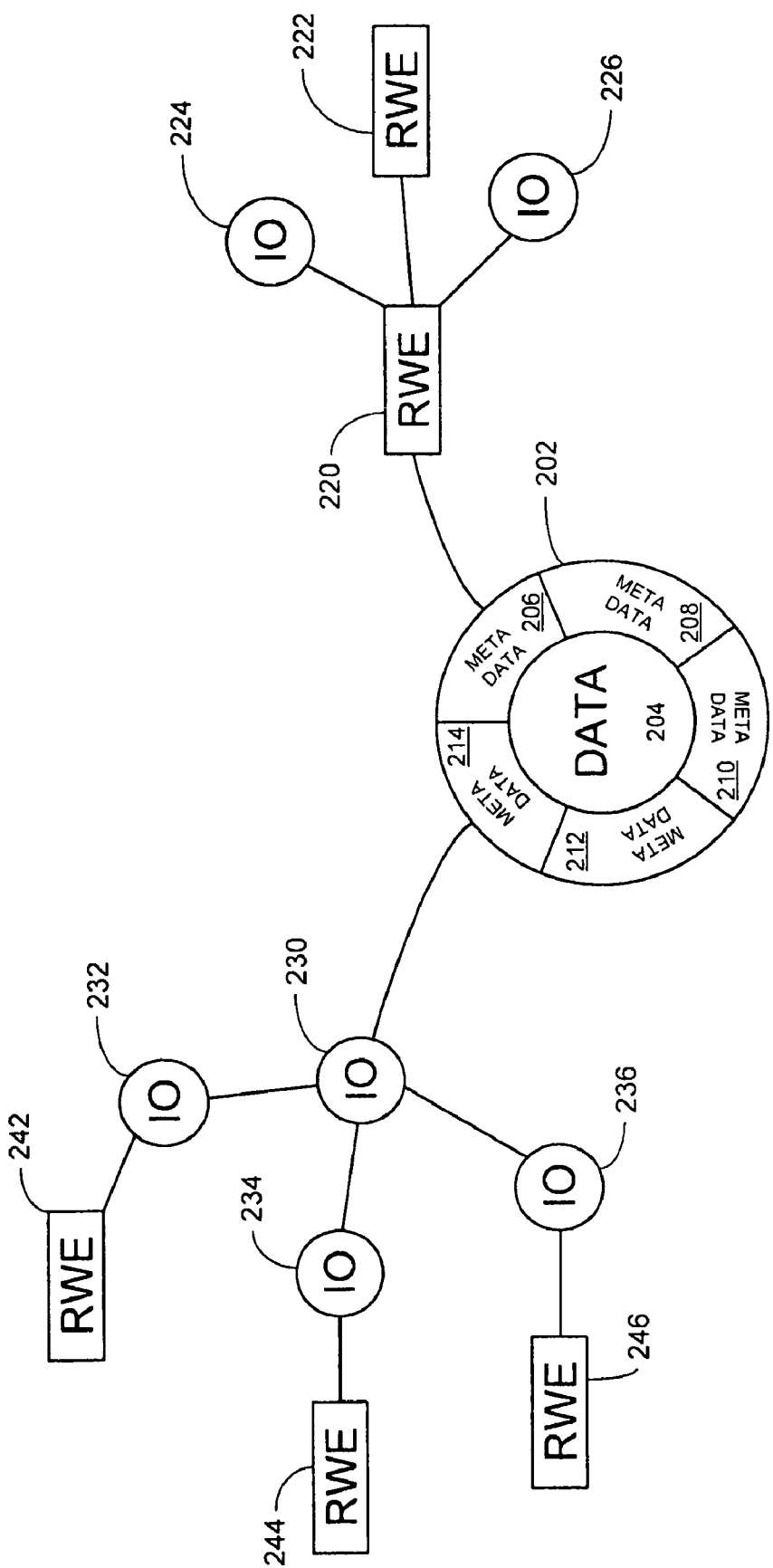
FIG. 2 illustrates metadata defining the relationships between RWEs and IOs on one embodiment of a W4 COMN.

FIG. 2 illustrates one embodiment of metadata defining the relationships between RWEs and IOs on the W4 COMN. In the embodiment shown, an IO 202 includes object data 204 and five discrete items of metadata 206, 208, 210, 212, 214. Some items of metadata 208, 210, 212 can contain information related only to the object data 204 and unrelated to any other IO or RWE. For example, a creation date, text or an image that is to be associated with the object data 204 of the IO 202.

Some of items of metadata 206, 214, on the other hand, can identify relationships between the IO 202 and other RWEs and IOs. As illustrated, the IO 202 is associated by one item of metadata 206 with an RWE 220 that RWE 220 is further associated with two IOs 224, 226 and a second RWE 222 based on some information known to the W4 COMN. For example, could describe the relations between an image (IO 202) containing metadata 206 that identifies the electronic camera (the first RWE 220) and the user (the second RWE 224) that is known by the system to be the owner of the camera 220. Such ownership information can be determined, for example, from one or another of the IOs 224, 226 associated with the camera 220.

FIG. 2 also illustrates metadata 214 that associates the IO 202 with another IO 230. This IO 230 is itself associated with three other IOs 232, 234, 236 that are further associated with different RWEs 242, 244, 246. This part of FIG. 2, for example, could describe the relations between a music file (IO 202) containing metadata 206 that identifies the digital rights file (the first IO 230) that defines the scope of the rights of use associated with this music file 202. The other IOs 232, 234, 236 are other music files that are associated with the rights of use and which are currently associated with specific owners (RWEs 242, 244, 246).

Figure 3:
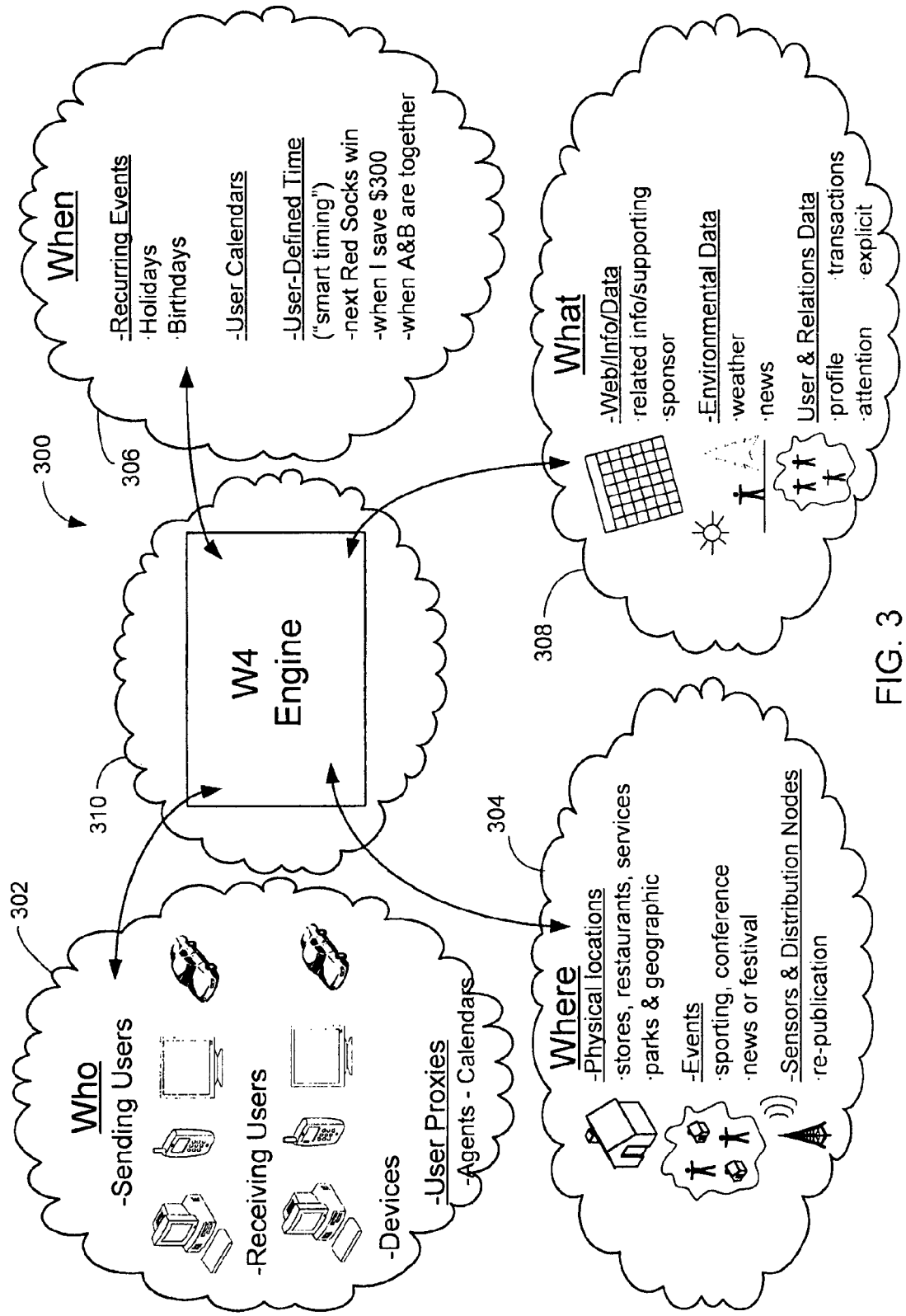
FIG. 3 illustrates a conceptual model of one embodiment of a W4 COMN.

FIG. 3 illustrates one embodiment of a conceptual model of a W4 COMN. The W4 COMN 300 creates an instrumented messaging infrastructure in the form of a global logical network cloud conceptually sub-divided into networked-clouds for each of the 4Ws: Who, Where, What and When. In the Who cloud 302 are all users whether acting as senders, receivers, data points or confirmation/certification sources as well as user proxies in the forms of user-program processes, devices, agents, calendars, etc.

In the Where cloud 304 are all physical locations, events, sensors or other RWEs associated with a spatial reference point or location. The When cloud 306 is composed of natural temporal events (that is events that are not associated with particular location or person such as days, times, seasons) as well as collective user temporal events (holidays, anniversaries, elections, etc.) and user-defined temporal events (birthdays, smart-timing programs).

The What cloud 308 is comprised of all known data—web or private, commercial or user—accessible to the W4 COMN, including for example environmental data like weather and news, RWE-generated data, IOs and IO data, user data, models, processes and applications. Thus, conceptually, most data is contained in the What cloud 308.

Some entities, sensors or data may potentially exist in multiple clouds either disparate in time or simultaneously. Additionally, some IOs and RWEs can be composites in that they combine elements from one or more clouds. Such composites can be classified as appropriate to facilitate the determination of associations between RWEs and IOs. For example, an event consisting of a location and time could be equally classified within the When cloud 306, the What cloud 308 and/or the Where cloud 304.

In one embodiment, a W4 engine 310 is center of the W4 COMN's intelligence for making all decisions in the W4 COMN. The W4 engine 310 controls all interactions between each layer of the W4 COMN and is responsible for executing any approved user or application objective enabled by W4 COMN operations or interoperating applications. In an embodiment, the W4 COMN is an open platform with standardized, published APIs for requesting (among other things) synchronization, disambiguation, user or topic addressing, access rights, prioritization or other value-based ranking, smart scheduling, automation and topical, social, spatial or temporal alerts.

One function of the W4 COMN is to collect data concerning all communications and interactions conducted via the W4 COMN, which can include storing copies of IOs and information identifying all RWEs and other information related to the IOs (e.g., who, what, when, where information). Other data collected by the W4 COMN can include information about the status of any given RWE and IO at any given time, such as the location, operational state, monitored conditions (e.g., for an RWE that is a weather sensor, the current weather conditions being monitored or for an RWE that is a cell phone, its current location based on the cellular towers it is in contact with) and current status.

The W4 engine 310 is also responsible for identifying RWEs and relationships between RWEs and IOs from the data and communication streams passing through the W4 COMN. The function of identifying RWEs associated with or implicated by IOs and actions performed by other RWEs may be referred to as entity extraction. Entity extraction can include both simple actions, such as identifying the sender and receivers of a particular IO, and more complicated analyses of the data collected by and/or available to the W4 COMN, for example determining that a message listed the time and location of an upcoming event and associating that event with the sender and receiver(s) of the message based on the context of the message or determining that an RWE is stuck in a traffic jam based on a correlation of the RWE's location with the status of a co-located traffic monitor.

It should be noted that when performing entity extraction from an IO, the IO can be an opaque object with only where only W4 metadata related to the object is visible, but internal data of the IO (i.e., the actual primary or object data contained within the object) are not, and thus metadata extraction is limited to the metadata. Alternatively, if internal data of the IO is visible, it can also be used in entity extraction, e.g. strings within an email are extracted and associated as RWEs to for use in determining the relationships between the sender, user, topic or other RWE or IO impacted by the object or process.

In the embodiment shown, the W4 engine 310 can be one or a group of distributed computing devices, such as a general-purpose personal computers (PCs) or purpose built server computers, connected to the W4 COMN by communication hardware and/or software. Such computing devices can be a single device or a group of devices acting together. Computing devices can be provided with any number of program modules and data files stored in a local or remote mass storage device and local memory (e.g., RAM) of the computing device. For example, as mentioned above, a computing device can include an operating system suitable for controlling the operation of a networked computer, such as the WINDOWS XP or WINDOWS SERVER operating systems from MICROSOFT CORPORATION.

Some RWEs can also be computing devices such as, without limitation, smart phones, web-enabled appliances, PCs, laptop computers, and personal data assistants (PDAs). Computing devices can be connected to one or more communications networks such as the Internet, a publicly switched telephone network, a cellular telephone network, a satellite communication network, a wired communication network such as a cable television or private area network. Computing devices can be connected any such network via a wired data connection or wireless connection such as a wi-fi, a WiMAX (802.36), a Bluetooth or a cellular telephone connection.

Local data structures, including discrete IOs, can be stored on a computer-readable medium (not shown) that is connected to, or part of, any of the computing devices described herein including the W4 engine 310. For example, in one embodiment, the data backbone of the W4 COMN, discussed below, includes multiple mass storage devices that maintain the IOs, metadata and data necessary to determine relationships between RWEs and IOs as described herein.

Figure 4:
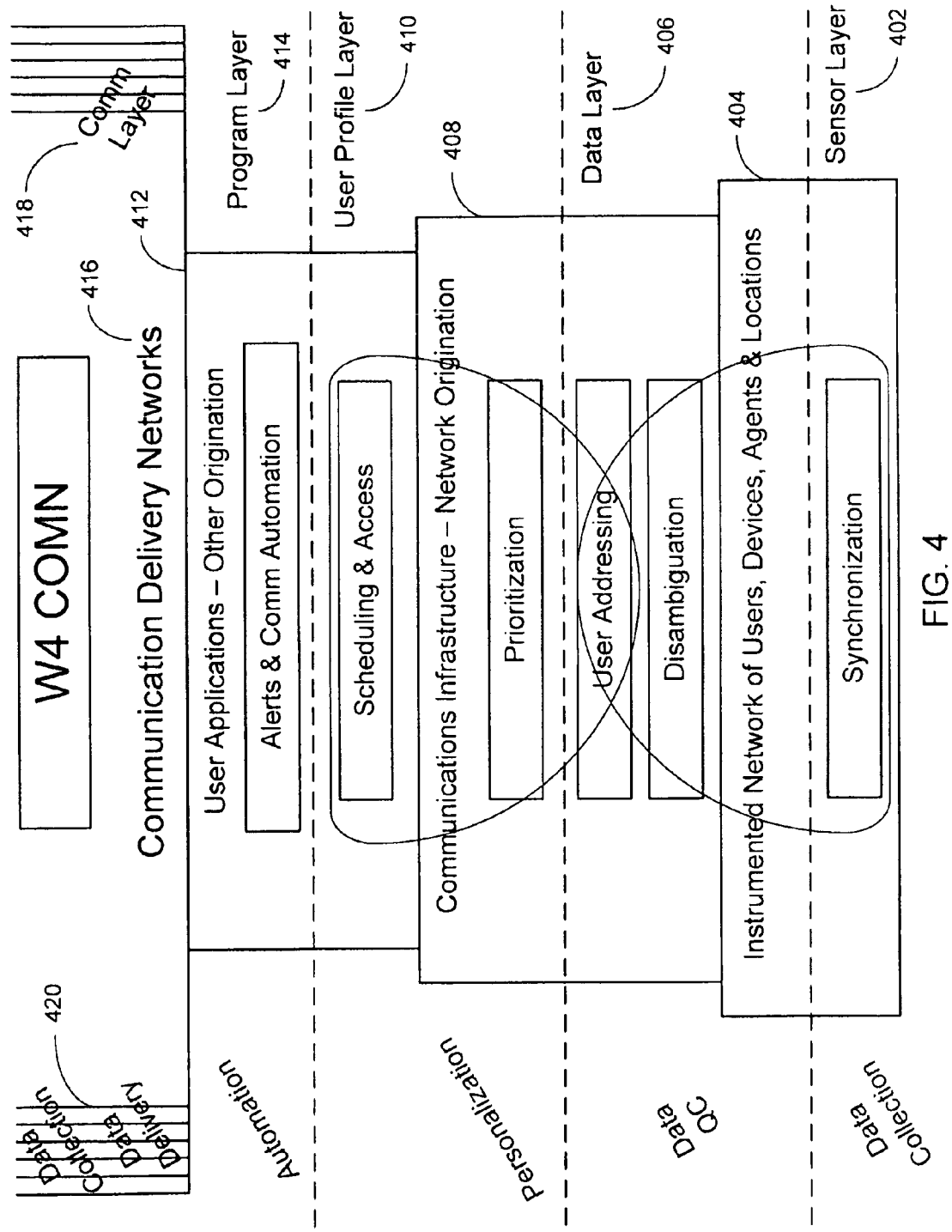
FIG. 4 illustrates the functional layers of one embodiment of the W4 COMN architecture.

FIG. 4 illustrates one embodiment of the functional layers of a W4 COMN architecture. At the lowest layer, referred to as the sensor layer 402, is the network 404 of the actual devices, users, nodes and other RWEs. Sensors include known technologies like web analytics, GPS, cell-tower pings, use logs, credit card transactions, online purchases, explicit user profiles and implicit user profiling achieved through behavioral targeting, search analysis and other analytics models used to optimize specific network applications or functions.

The data layer 406 stores and catalogs the data produced by the sensor layer 402. The data can be managed by either the network 404 of sensors or the network infrastructure 406 that is built on top of the instrumented network of users, devices, agents, locations, processes and sensors. The network infrastructure 408 is the core under-the-covers network infrastructure that includes the hardware and software necessary to receive that transmit data from the sensors, devices, etc. of the network 404. It further includes the processing and storage capability necessary to meaningfully categorize and track the data created by the network 404.

The user profiling layer 410 performs the W4 COMN's user profiling functions. This layer 410 can further be distributed between the network infrastructure 408 and user applications/processes 412 executing on the W4 engine or disparate user computing devices. Personalization is enabled across any single or combination of communication channels and modes including email, IM, texting (SMS, etc.), photoblogging, audio (e.g. telephone call), video (teleconferencing, live broadcast), games, data confidence processes, security, certification or any other W4 COMM process call for available data.

In one embodiment, the user profiling layer 410 is a logic-based layer above all sensors to which sensor data are sent in the rawest form to be mapped and placed into the W4 COMN data backbone 420. The data (collected and refined, related and deduplicated, synchronized and disambiguated) are then stored in one or a collection of related databases available applications approved on the W4 COMN. Network-originating actions and communications are based upon the fields of the data backbone, and some of these actions are such that they themselves become records somewhere in the backbone, e.g. invoicing, while others, e.g. fraud detection, synchronization, disambiguation, can be done without an impact to profiles and models within the backbone.

Actions originating from outside the network, e.g., RWEs such as users, locations, proxies and processes, come from the applications layer 414 of the W4 COMN. Some applications can be developed by the W4 COMN operator and appear to be implemented as part of the communications infrastructure 408, e.g. email or calendar programs because of how closely they operate with the sensor processing and user profiling layer 410. The applications 412 also serve as a sensor in that they, through their actions, generate data back to the data layer 406 via the data backbone concerning any data created or available due to the applications execution.

In one embodiment, the applications layer 414 can also provide a user interface (UI) based on device, network, carrier as well as user-selected or security-based customizations. Any UI can operate within the W4 COMN if it is instrumented to provide data on user interactions or actions back to the network. In the case of W4 COMN enabled mobile devices, the UI can also be used to confirm or disambiguate incomplete W4 data in real-time, as well as correlation, triangulation and synchronization sensors for other nearby enabled or non-enabled devices.

At some point, the network effects enough enabled devices allow the network to gather complete or nearly complete data (sufficient for profiling and tracking) of a non-enabled device because of its regular intersection and sensing by enabled devices in its real-world location.

Above the applications layer 414, or hosted within it, is the communications delivery network 416. The communications delivery network can be operated by the W4 COMN operator or be independent third-party carrier service. Data may be delivered via synchronous or asynchronous communication. In every case, the communication delivery network 414 will be sending or receiving data on behalf of a specific application or network infrastructure 408 request.

The communication delivery layer 418 also has elements that act as sensors including W4 entity extraction from phone calls, emails, blogs, etc. as well as specific user commands within the delivery network context. For example, "save and prioritize this call" said before end of call can trigger a recording of the previous conversation to be saved and for the W4 entities within the conversation to analyzed and increased in weighting prioritization decisions in the personalization/user profiling layer 410.

Figure 5:
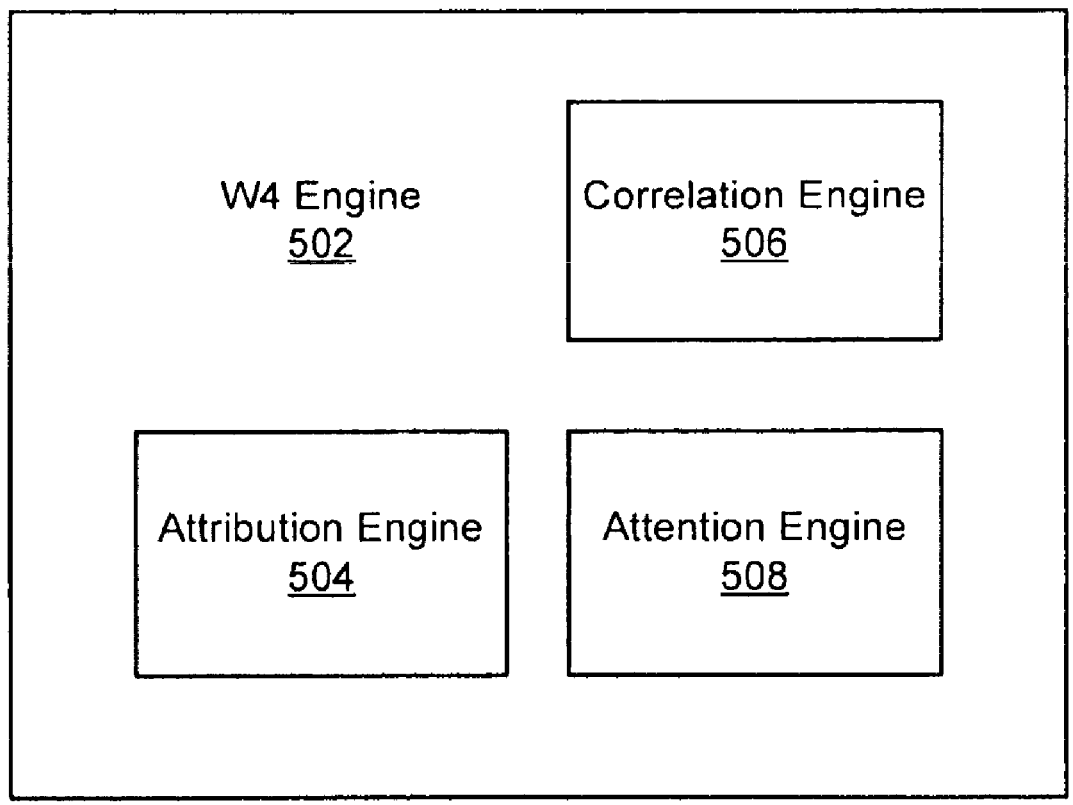
FIG. 5 illustrates the analysis components of one embodiment of a W4 engine as shown in FIG. 2.

FIG. 5 illustrates one embodiment of the analysis components of a W4 engine as shown in FIG. 3. As discussed above, the W4 Engine is responsible for identifying RWEs and relationships between RWEs and IOs from the data and communication streams passing through the W4 COMN.

In one embodiment the W4 engine connects, interoperates and instruments all network participants through a series of sub-engines that perform different operations in the entity extraction process. The attribution engine 504 tracks the real-world ownership, control, publishing or other conditional rights of any RWE in any IO. Whenever a new IO is detected by the W4 engine 502, e.g., through creation or transmission of a new message, a new transaction record, a new image file, etc., ownership is assigned to the IO. The attribution engine 504 creates this ownership information and further allows this information to be determined for each IO known to the W4 COMN.

The correlation engine 506 can operates two capacities: first, to identify associated RWEs and IOs and their relationships (such as by creating a combined graph of any combination of RWEs and IOs and their attributes, relationships and reputations within contexts or situations) and second, as a sensor analytics pre-processor for attention events from any internal or external source.

In one embodiment, the identification of associated RWEs and IOs function of the correlation engine 506 is done by graphing the available data, using, for example, one or more histograms A histogram is a mapping technique that counts the number of observations that fall into various disjoint categories (i.e. bins.). By selecting each IO, RWE, and other known parameters (e.g., times, dates, locations, etc.) as different bins and mapping the available data, relationships between RWEs, IOs and the other parameters can be identified. A histogram of all RWEs and IOs is created, from which correlations based on the graph can be made.

As a pre-processor, the correlation engine 506 monitors the information provided by RWEs in order to determine if any conditions are identified that can trigger an action on the part of the W4 engine 502. For example, if a delivery condition has been associated with a message, when the correlation engine 506 determines that the condition is met, it can transmit the appropriate trigger information to the W4 engine 502 that triggers delivery of the message.

The attention engine 508 instruments all appropriate network nodes, clouds, users, applications or any combination thereof and includes close interaction with both the correlation engine 506 and the attribution engine 504.

Figure 6:
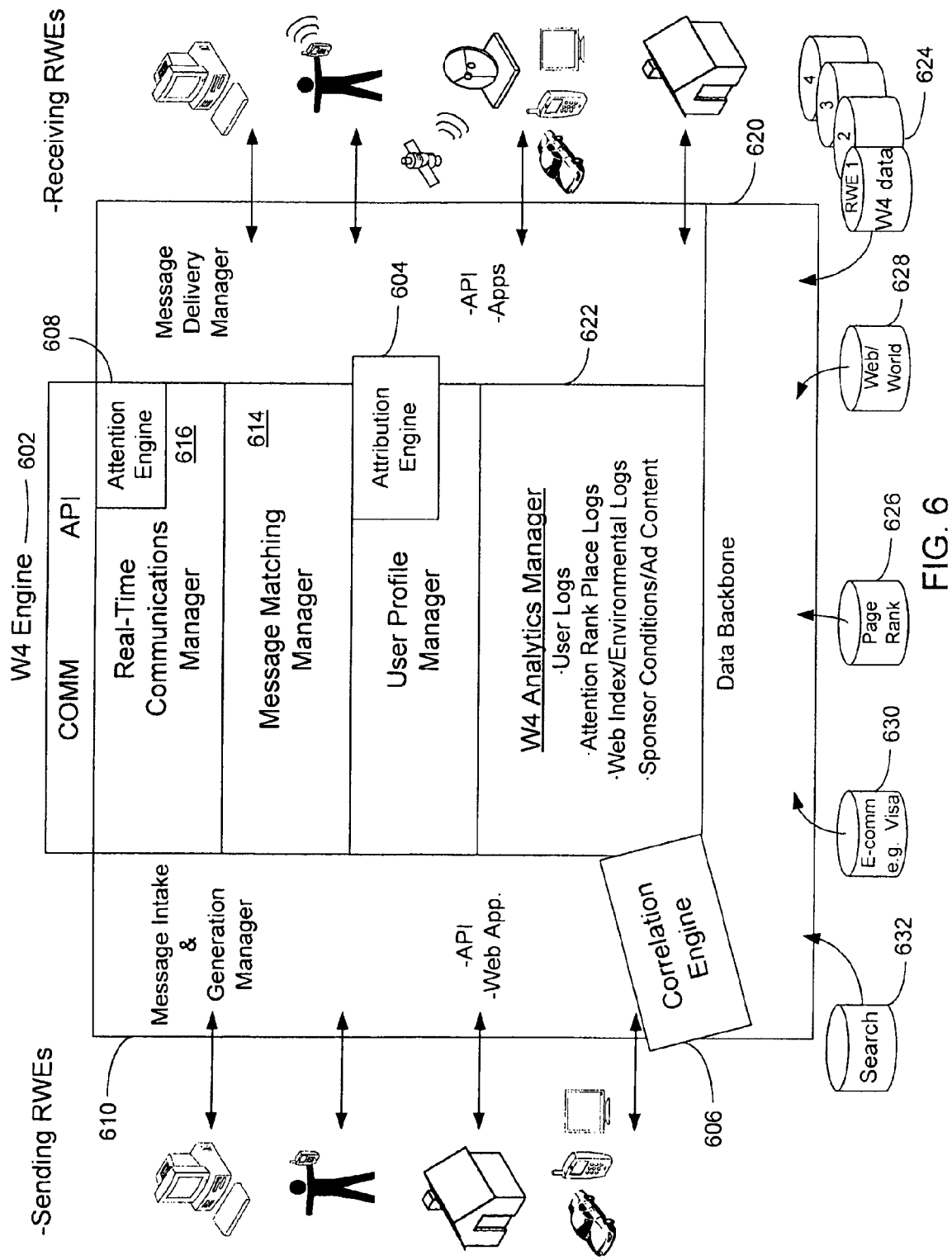
FIG. 6 illustrates one embodiment of a W4 engine showing different components within the sub-engines shown in FIG. 5.

FIG. 6 illustrates one embodiment of a W4 engine showing different components within the sub-engines described above with reference to FIG. 4. In one embodiment the W4 engine 602 includes an attention engine 608, attribution engine 604 and correlation engine 606 with several sub-managers based upon basic function.

The attention engine 608 includes a message intake and generation manager 610 as well as a message delivery manager 612 that work closely with both a message matching manager 614 and a real-time communications manager 616 to deliver and instrument all communications across the W4 COMN.

The attribution engine 604 works within the user profile manager 618 and in conjunction with all other modules to identify, process/verify and represent ownership and rights information related to RWEs, IOs and combinations thereof.

The correlation engine 606 dumps data from both of its channels (sensors and processes) into the same data backbone 620 which is organized and controlled by the W4 analytics manager 622. The data backbone 620 includes both aggregated and individualized archived versions of data from all network operations including user logs 624, attention rank place logs 626, web indices and environmental logs 618, e-commerce and financial transaction information 630, search indexes and logs 632, sponsor content or conditionals, ad copy and any and all other data used in any W4COMN process, IO or event. Because of the amount of data that the W4 COMN will potentially store, the data backbone 620 includes numerous database servers and datastores in communication with the W4 COMN to provide sufficient storage capacity.

The data collected by the W4 COMN includes spatial data, temporal data, RWE interaction data, IO content data (e.g., media data), and user data including explicitly-provided and deduced social and relationship data. Spatial data can be any data identifying a location associated with an RWE. For example, the spatial data can include any passively collected location data, such as cell tower data, global packet radio service (GPRS) data, global positioning service (GPS) data, WI-FI data, personal area network data, IP address data and data from other network access points, or actively collected location data, such as location data entered by the user.

Temporal data is time based data (e.g., time stamps) that relate to specific times and/or events associated with a user and/or the electronic device. For example, the temporal data can be passively collected time data (e.g., time data from a clock resident on the electronic device, or time data from a network clock), or the temporal data can be actively collected time data, such as time data entered by the user of the electronic device (e.g., a user maintained calendar).

Logical and IO data refers to the data contained by an IO as well as data associated with the IO such as creation time, owner, associated RWEs, when the IO was last accessed, the topic or subject of the IO (from message content or "re" or subject line, as some examples) etc. For example, an IO may relate to media data. Media data can include any data relating to presentable media, such as audio data, visual data, and audiovisual data. Audio data can be data relating to downloaded music, such as genre, artist, album and the like, and includes data regarding ringtones, ringbacks, media purchased, playlists, and media shared, to name a few. The visual data can be data relating to images and/or text received by the electronic device (e.g., via the Internet or other network). The visual data can be data relating to images and/or text sent from and/or captured at the electronic device.

Audiovisual data can be data associated with any videos captured at, downloaded to, or otherwise associated with the electronic device. The media data includes media presented to the user via a network, such as use of the Internet, and includes data relating to text entered and/or received by the user using the network (e.g., search terms), and interaction with the network media, such as click data (e.g., advertisement banner clicks, bookmarks, click patterns and the like). Thus, the media data can include data relating to the user's RSS feeds, subscriptions, group memberships, game services, alerts, and the like.

The media data can include non-network activity, such as image capture and/or video capture using an electronic device, such as a mobile phone. The image data can include metadata added by the user, or other data associated with the image, such as, with respect to photos, location when the photos were taken, direction of the shot, content of the shot, and time of day, to name a few. Media data can be used, for example, to deduce activities information or preferences information, such as cultural and/or buying preferences information.

Relationship data can include data relating to the relationships of an RWE or IO to another RWE or IO. For example, the relationship data can include user identity data, such as gender, age, race, name, social security number, photographs and other information associated with the user's identity. User identity information can also include e-mail addresses, login names and passwords. Relationship data can further include data identifying explicitly associated RWEs. For example, relationship data for a cell phone can indicate the user that owns the cell phone and the company that provides the service to the phone. As another example, relationship data for a smart car can identify the owner, a credit card associated with the owner for payment of electronic tolls, those users permitted to drive the car and the service station for the car.

Relationship data can also include social network data. Social network data includes data relating to any relationship that is explicitly defined by a user or other RWE, such as data relating to a user's friends, family, co-workers, business relations, and the like. Social network data can include, for example, data corresponding with a user-maintained electronic address book. Relationship data can be correlated with, for example, location data to deduce social network information, such as primary relationships (e.g., user-spouse, user-children and user-parent relationships) or other relationships (e.g., user-friends, user-co-worker, user-business associate relationships). Relationship data also can be utilized to deduce, for example, activities information.

Interaction data can be any data associated with user interaction of the electronic device, whether active or passive. Examples of interaction data include interpersonal communication data, media data, relationship data, transactional data and device interaction data, all of which are described in further detail below. Table 1, below, is a non-exhaustive list including examples of electronic data.

TABLE 1

Examples of Electronic Data

| Spatial Data | Temporal Data | Interaction Data |
| --- | --- | --- |
| Cell tower | Time stamps | Interpersonal |
| GPRS | Local clock | communications |
| GPS | Network clock | Media |
| WiFi | User input of time | Relationships |
| Personal area network | | Transactions |
| Network access points | | Device |
| User input of location | | interactions |
| Geo-coordinates | | |

Interaction data includes communication data between any RWEs that is transferred via the W4 COMN. For example, the communication data can be data associated with an incoming or outgoing short message service (SMS) message, email message, voice call (e.g., a cell phone call, a voice over IP call), or other type of interpersonal communication related to an RWE. Communication data can be correlated with, for example, temporal data to deduce information regarding frequency of communications, including concentrated communication patterns, which can indicate user activity information.

The interaction data can also include transactional data. The transactional data can be any data associated with commercial transactions undertaken by or at the mobile electronic device, such as vendor information, financial institution information (e.g., bank information), financial account information (e.g., credit card information), merchandise information and costs/prices information, and purchase frequency information, to name a few. The transactional data can be utilized, for example, to deduce activities and preferences information. The transactional information can also be used to deduce types of devices and/or services the user owns and/or in which the user can have an interest.

The interaction data can also include device or other RWE interaction data. Such data includes both data generated by interactions between a user and a RWE on the W4 COMN and interactions between the RWE and the W4 COMN. RWE interaction data can be any data relating to an RWE's interaction with the electronic device not included in any of the above categories, such as habitual patterns associated with use of an electronic device data of other modules/applications, such as data regarding which applications are used on an electronic device and how often and when those applications are used. As described in further detail below, device interaction data can be correlated with other data to deduce information regarding user activities and patterns associated therewith. Table 2, below, is a non-exhaustive list including examples of interaction data.

TABLE 2

Examples of Interaction Data

| Type of Data | Example(s) |
| --- | --- |
| Interpersonal communication data | Text-based communications, such as SMS and e-mail |
| | Audio-based communications, such as voice calls, voice notes, voice mail |
| | Media-based communications, such as multimedia messaging service (MMS) communications |
| | Unique identifiers associated with a communication, such as phone numbers, e-mail addresses, and network addresses |
| Media data | Audio data, such as music data (artist, genre, track, album, etc.) |
| | Visual data, such as any text, images and video data, including Internet data, picture data, podcast data and playlist data |
| | Network interaction data, such as click patterns and channel viewing patterns |
| Relationship data | User identifying information, such as name, age, gender, race, and social security number |
| | Social network data |
| Transactional data | Vendors |
| | Financial accounts, such as credit cards and banks data |
| | Type of merchandise/services purchased |
| | Cost of purchases |
| | Inventory of purchases |
| Device interaction data | Any data not captured above dealing with user interaction of the device, such as patterns of use of the device, applications utilized, and so forth |

Context Enhanced Mapping

Online mapping and routing, for example, Yahoo Maps, has been available via the Internet for many years. Users can display maps at varying levels of detail, can plot routes between points, and display a range of content, such as, for example hotels or businesses of a specific type. A person may wish, however, to capture a more complex set of real-time, rich information overlaid on their map, for example, a person may wish to create a map for a specific purpose, location or locations and target audience. For example, a user may wish to display a map enhanced with content for a 14 year-old girl who has soccer for a hobby who is having an all-girl birthday party in the city. In another example, a user may wish to display a map enhanced with content for a visiting physics professor from Japan who is in his 50s who likes jazz and physics. In yet another example, a person may wish to display a map showing points of interest for a punk rock band visiting Los Angeles for the first time.

More abstractly, when a user is requesting a map or a route, the user may be said to have a specific context in mind. In one embodiment, the user's context can be defined as a set of criteria that describe or circumscribe one or more related ideas central to that user in that context, and which can thus be used to create a model of the map needs for that instance. The criteria can be conceptually divided into four categories: Who, What, When and Where.

"Who" criteria are persons, devices, or proxies who are related to the ideas embodied in the context. "Who" may be a known person, such as the user or a specific person known by the user. "Who" may also be a list of specific persons, such as the contact list stored on the PDA of a user, or persons listed on a user's social network profile as friends. Alternatively, "Who" can be a general description of persons of interest, such as persons who are interested in surfing, single women in their 40's who drive motorcycles and like yoga, men who like football and commute by bus, persons who pass by a billboard more than three times a week and/or customers of a specific restaurant who also drive BMWs.

"What" criteria are objects or topics, concrete or abstract that relate to the ideas embodied in the context. "What" may be the form of media the user is interested in, such as photos, music or videos. "What" may be a genre of music or video, such as country or rock. "What" may be subject matter addressed in media, such as love songs or even specific lyrical phrases. Alternatively, "What" may be a mood or atmosphere, such as happy, sad, energetic, or relaxed. As an indicator of topical relevance, "What" criteria are an unbounded set of things determined by human creation, attention and association or tagging.

"When" criteria are temporal constructs such as dates and times which are related to the ideas embodied in the context. "When" may be the current date and time. "When" may also be a specific date and time in the past or the future, or a range of dates and times in the past or the future, such as a duration, e.g. two hours, four weeks, one year. "When" may be a conditional occurrence if specified conditions or criteria are met. "When" may be an offset from a specific date, for example, ten days in the past, or an offset from a conditional occurrence, ten days after a mortgage payment is late. Alternatively, "When" can be an event on a calendar, such as a birthday, a season or a holiday, or an event of personal or societal/social importance, such as the last time a favorite sports team won a championship.

"Where" criteria are physical locations. "Where" may be a user's current location. "Where" may be specific places, such as a country, a state, a city, a neighborhood. "Where" may be defined as the location of an event, such as a concert or some other newsworthy occurrence, or alternatively the personal location of a user when they learned of an event, e.g. where were you when you heard about 9/11. Alternatively, "Where" can be a general description of places of interest, such as blues or jazz clubs, or a conditional location depending on the satisfaction or resolution of specified criteria. For example, "where" can be the real-time most popular club for 24-35 year olds, or "where" can be the research lab where breast cancer is finally cured.

The embodiments of the present disclosure discussed below illustrate application of the present disclosure within a W4 COMN. Nevertheless, it is understood that the disclosure can be implemented using any networked system, virtual or real, integrated or distributed through multiple parties, that is capable of collecting, storing accessing and/or processing user profile data, as well as temporal, spatial, topical and social data relating to users and their devices. Thus, the term W4 COMN is used herein for convenience to describe a system and/or network having the features, functions and/or components described herein throughout.

A W4 COMN can provide a platform that clusters map features and content around known W4 RWEs or IO types. Such data clustering can provide a highly personalized, automated mapping and display centered around a specific user or set of users and their associated devices, data sources and associations with other RWEs or IOs using the profile created from the aggregated W4COMN data collected whether on or off-network, from third-parties, carriers, partners, and so forth.

Figure 7:
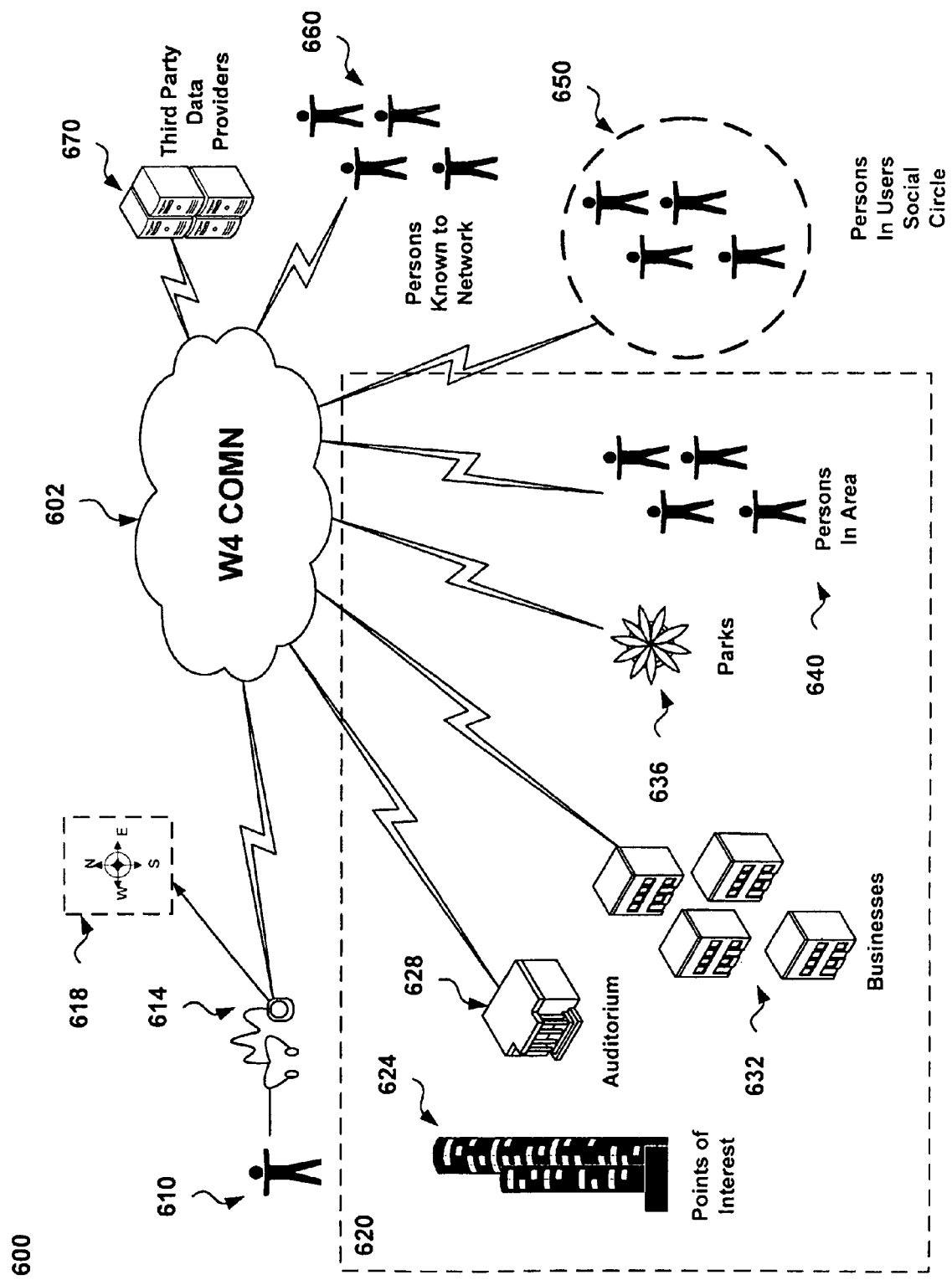
FIG. 7 is a high level diagram of a system that can provide enhanced content for a map or route request.

FIG. 7 is a high level diagram 600 of a system that can provide enhanced content for a map or route request. A user 610 can submit a request to network 602, for example, a W4 COMN, to display a map 618 on the user's proxy device 614. In the illustrated embodiment, the bounds of the requested map encompass a geographical area 620. Within the geographical area 620 are a large array of entities known to the network 602. Such entities include tourist attractions and other points of interest 624, auditoriums and other public venues 628, businesses of various types 632, parks and recreation areas 636, and persons 640. The network collects spatial, temporal, social, and topical data, including behavioral and interaction data about these entities that can be used to enhance information displayed on maps of the area.

Outside of the geographical area 620 of the map request are a large, and potentially unbounded set of entities known to the network 602. These entities can include the persons within user's social networks 650, other persons known to the network 660 (i.e. not known to the user and not in the geographical area), and third party data sources 670 which can include free and premium information services which provide data about other entities and topics including routes labeled for a specific purpose, reviews, ratings or rankings of locations by users and multimedia content associated with locations, events objects or people. The network collects spatial, temporal, social, and topical data, including behavioral and interaction data about these entities as well. This data may relate to entities within the geographical area and can additionally used to enhance information displayed on maps of the area.

Figure 8:
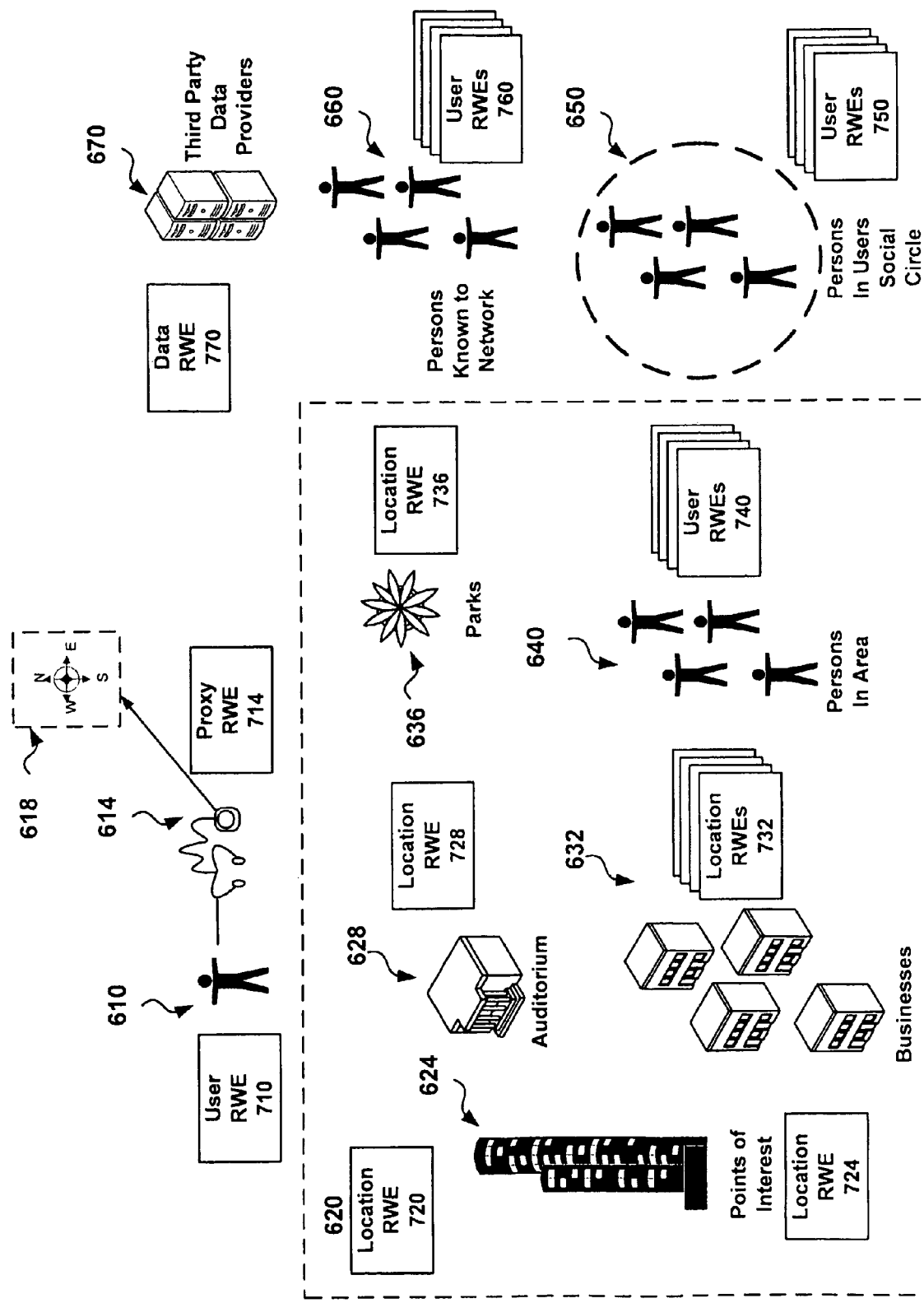
FIG. 8 illustrates how the entities displayed in FIG. 7 may be defined to a network, for example a W4 COMN.

FIG. 8 illustrates how the entities displayed in FIG. 7 may be defined to a network, for example a W4 COMN. User 610, 640, 650 and 660 are represented by user RWEs 710, 740, 750 and 760 respectively. User 610's proxy device 612 is represented as a proxy RWE 712. The area represented by the map 620 may be a distinct geographical entity such as a city, and can itself be represented as a location RWE 720. Locations 622, 624, 626, 628, and 630 are represented as location RWEs 722, 724, 726, 728, and 730 respectively. A third party data provider is represented as data server RWE 760.

Figure 9:
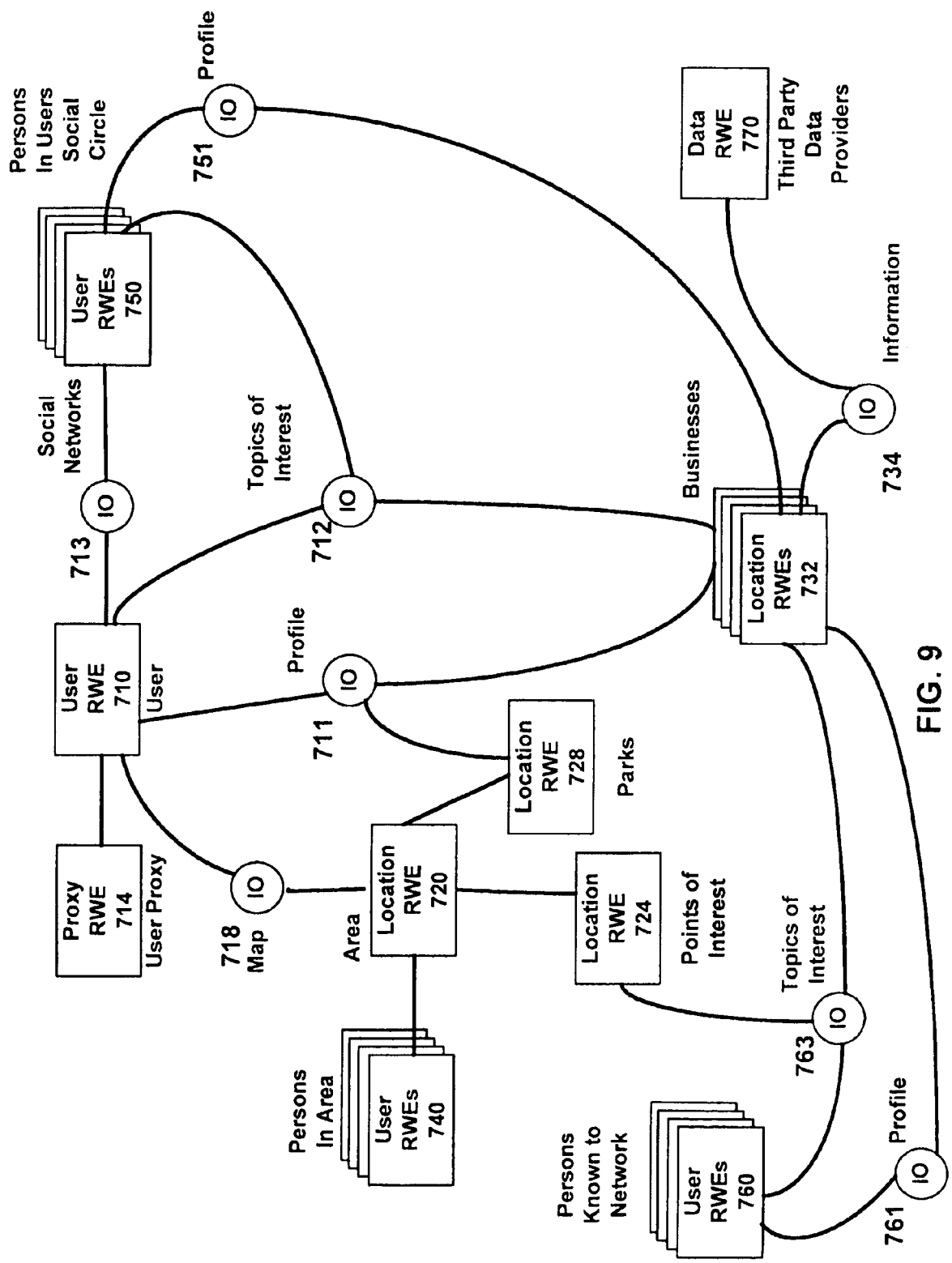
FIG. 9 illustrates one embodiment of a data model which shows how the RWEs shown in FIG. 8 can be related to one another directly and indirectly though intermediate IOs.

FIG. 9 illustrates one embodiment of a data model which shows how the RWEs shown in FIG. 8 can be related to one another directly and indirectly though intermediate IOs. The relationships illustrated are intended to be illustrative, and do not represent the full range of interrelations among data supported by a W4 COMN.

A user 710 requesting a map can be related, directly or indirectly to one or more RWEs associated with spatial, temporal, social, and topical data that relate to the area encompassed by a map request, and which can be used to provide enhanced content on the map display. The user 710 can be related through a profile IO 711 to, for example, one or more location RWEs, which may encompass parks 728 or businesses locations 732 frequented by the user or which the user has explicitly designated as a personal favorite. The user 710 can also be related through topical IO 712 to, for example, one or more business locations RWEs 732, which engage in a line of business of interest to the end user. For example, if the requesting user likes Jazz music, the topical IO could be night clubs featuring Jazz.

The user 710 can additionally be related to a group of users 750 through a social network 713. Each of users 750 may relate directly or indirectly to one or more RWEs associated with spatial, temporal, social, and topical data that relate to the area encompassed by a map request. For example, profile data 751 for one or more of the users 751 can indicate that one or more business locations 732 are frequented by or favorably reviewed by such users. The users 751 may also can also be related through one or more topical IOs 712 to, for example, one or more business locations RWEs 732, which engage in a line of business of interest to the user. For example, such a topical IO could relate to a type of food, such as sushi, favored by the end user.

The user 710 is also associated with a map request 718. Through the map request 718 the user 710 can also be considered to be logically related to a geographical area RWE 720 which can be related to RWEs of interest within the area such as points of interest 724 (i.e. tourist locations) and parks 728.

Context enhanced content can also be obtained from the perspective of users known to the network 760 who are not related to the end user. Each of users 760 may relate directly or indirectly to one or more RWEs associated with spatial, temporal, social, and topical data that relate to the area encompassed by a map request. For example, the users 760 can also be related through a topical IO 763 to, for example, one or more business locations RWEs 732, which engage in a line of business of interest to the user. For example, such a topical IO could relate to a type of activity favored by the user, such as tennis.

Any entity, for example the business locations 732, can be associated with a variety of additional information 734. Such additional information may provide, for example, descriptions of a business, basic commercial information about a business such as hours of operation or products offered, commercial incentives, reviews, ratings or rankings of the business relative to other local businesses. Such information can be sourced from third party data providers 770. Such third party providers may be, for example, Internet search engines, public or semi-public user groups, social networking site providers or premium content providers, such as a paid site having restaurant reviews (e.g. Zagats)

In one embodiment, all of the relationships shown in FIG. 9 are maintained by processes existing within the network. Using social, spatial, temporal and logical data available about a specific user, topic or logical data object, every entity known to the W4 COMN can be mapped and represented against all other known entities and data objects in order to create both a micro graph for every entity as well as a global graph that relates all known entities with one another. In one embodiment, such relationships between entities and data objects are stored in a global index within the W4 COMN.

In one embodiment, the W4 COMN builds a profile of a user over time by collecting data from the user or from information sources available to the network so as to gain an understanding of where they were born, where they have lived, and where they live today. Using social data, the W4 COMN can also create an overlapping social network profile which places the user in a temporal, geographic and social graph, thus determining where a user lived when and with whom. User RWEs can be also be associated with other RWEs through interaction data. Users who are interested in the same time/place can declare their interests and be connected to a topic based social network through, for example, an IO relating to a topic.

Data and data relationships such as those shown can be used to add enhanced content to a map displayed by a context enhanced mapping system. In the simplest case, a user can enter a request for a map with no additional parameters and the system can retrieve enhanced content for entities within the geographical scope of the mapping request at the specific time and place of the request.

For example, in FIG. 9, the user 710 has a profile IO 711 that associates the user with parks 728 and businesses 732 within the scope of the mapping request that, for example, past behavior indicates the user has visited. The user 710 is also associated with topical IOs 712 that associate the user with businesses 732 within the scope of the mapping request that, for example, indicate the businesses relate to one or more interests of the user. The user is also associated with one or more social networks 714 that associate the user with one or more users 750. The users 750 can have profile data 751 and topical interest 712 that associate those users with entities within the scope of the mapping request.

A context enhanced mapping request can additionally include parameters that explicitly modify the request with temporal, social, or topical criteria. Temporal criteria can be used to select enhanced content for entities having properties that vary over time. For example, a context enhanced mapping request could include criteria to select retail businesses that are open until 9:00 PM. Such information can be available to the network through information 734 associated with commercial locations within the scope of the mapping request.

Social criteria can be used to select enhanced content for entities that relate to one or more persons. For example, context enhanced mapping request could include criteria to select businesses that are patronized by ones which include as customers persons within one's social circle 713. Such information can be available to the network through information 734 associated with commercial locations within the scope of the mapping request where profile data 751 of the users 750 indicate such users patronize one or more business locations 732.

Topical criteria can be used to select enhanced content for entities that relate to a topic. For example, context enhanced mapping request could include criteria to select restaurants 732 that specialize in a specific cuisine, such as sushi. Such information can be available to the network through information 734 associated with commercial locations within the scope of the mapping request where a topical IO 732 indicates a business relates to the topic of the request.

A context enhanced mapping request can additionally include criteria that explicitly state the point of view of the mapping request. The mapping request can specify that enhanced content should be retrieved from the point of view of a group of persons known to the network. For example, a user 710 could enter a request context enhanced mapping request for businesses 732 or points of interest 724 which are related to person known to the network 760 through one or more topical IOs or whose profile data 761 indicate the businesses 732 are favored by one or more users 760.

Criteria specifying a group of users could select all persons known to the network 760 or select a subset of such persons. Such a subset could be selected with criteria related to any available profile data 761 or topical associations 763. Criteria related to profile data could include demographic data, such as age, gender, nationality and so forth, as well as criteria related to Network activity, such as early adopters, heavy users and so forth. Criteria related to topical interests could include user hobbies, music preferences, food preferences and so forth. Criteria specifying a group of users could explicitly or implicitly include or exclude the requesting user.

Referring back to previously cited examples, suppose, a user wishes to display a map enhanced with content for a 14 year-old girl who has soccer for a hobby who is having an all-girl birthday party in the city. The request could include criteria specifying a city, females aged 14, birthday parties, soccer, and so forth. Such a request could select users known to the network 760 who are female, aged 14, and select restaurants 732 favored by such persons. Locations 732 within the city having information 734 that indicate they relate to soccer or specialize in hosting birthday parties could be favored. Enhanced content could then be retrieved for a subset of locations best fitting the criteria of the mapping request. Such enhanced content could then be displayed on a map displayed on, for example, a user's mobile phone, gaming device or PDA.

In another example, suppose a user may wish to display a map enhanced with content for a visiting physics professor from Japan who is in his 50s who likes jazz and physics. The request could include criteria specifying a city, males aged 50 to 60, Japanese, jazz, and physics. Such a request could select users known to the network 760 who are Japanese, aged 50-60, and select business 732 favored by such persons. Locations 732 within the city having information 734 that indicate they relate to jazz or physics could be favored. Enhanced content could then be retrieved for a subset of locations best fitting the criteria of the mapping request. Such enhanced content could then be displayed on a map displayed on, for example, a user's mobile phone, gaming device or PDA.

In another example, suppose a user may wish to display a map enhanced with content for a set of conference attendees, which include the requesting user. The request could include criteria specifying a conference, a 70 mile radius, the requesting user and users attending the conference. Such a request could select users known to the network 760 whose profile 761 or whose topical associations 763 indicate are attending the conference, and would further select the requesting user 710. Locations 732 within a 70 mile radius of the conference having topical associations 712 or 763 indicating the location relates to interests of one or more attendees may be selected. Locations that are frequented by or favorably reviewed by the requesting user 710 may be favored. Enhanced content could then be retrieved for a subset of locations best fitting the criteria of the mapping request. Such enhanced content could then be displayed on a map displayed on, for example, a user's mobile phone, gaming device or computer.

Figure 10:
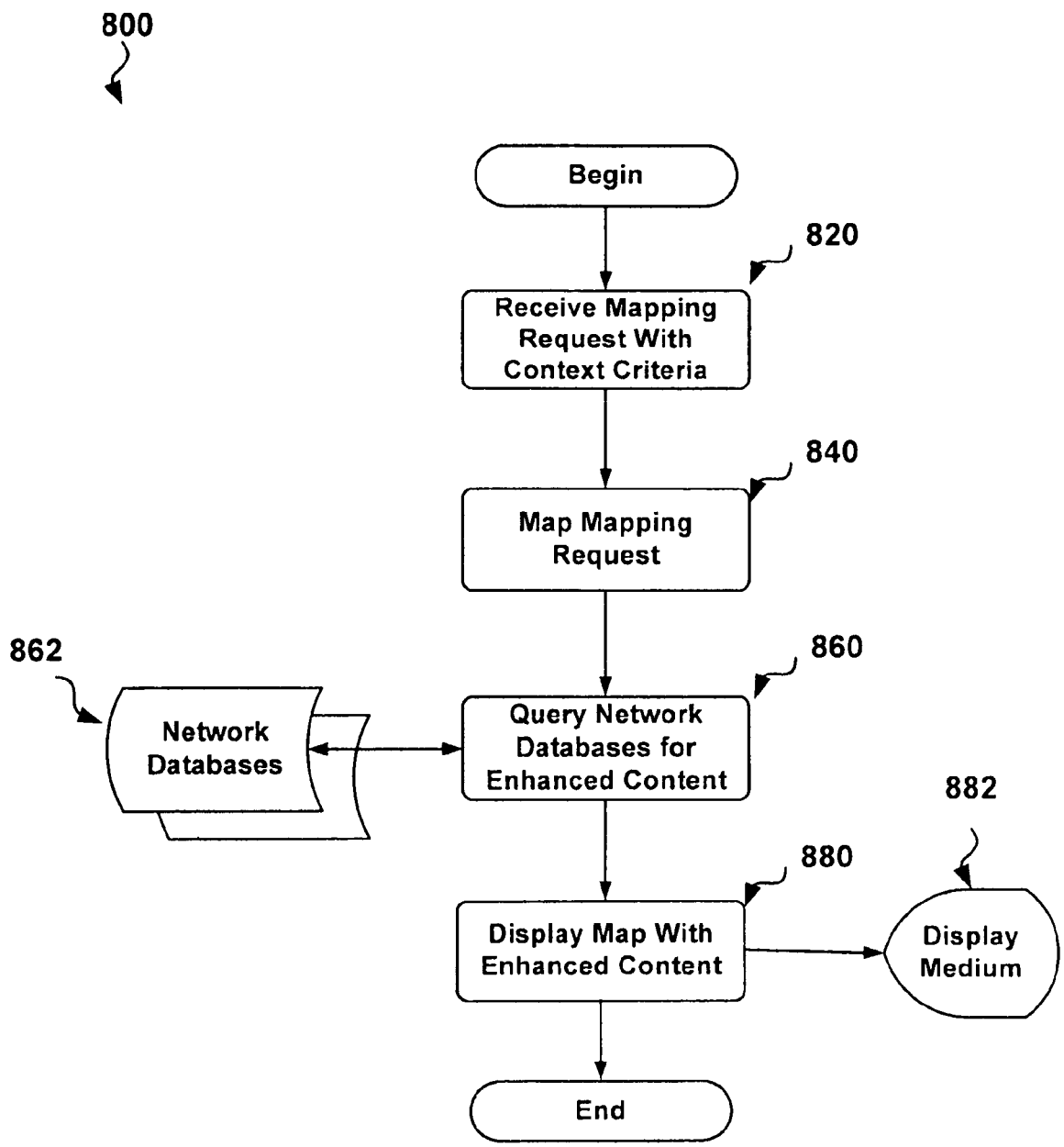
FIG. 10 illustrates one embodiment of a process 800 of how a network containing temporal, spatial, and social network and topical data for a plurality of users, devices, and locations (such as a W4 COMN), can be used to enable the display of maps having enhanced content related to complex user contexts having who, where, when, and what criteria.

FIG. 10 illustrates one embodiment of a process 800 of how a network containing temporal, spatial, and social network and topical data for a plurality of users, devices, and locations (such as a W4 COMN), can be used to enable the display of maps having enhanced content related to complex user contexts having who, where, when, and what criteria.

The process begins when a user enters a mapping request having context criteria 820 using a user proxy device such as, for example, a portable media player, mobile phone, gaming device, PDA, or computer. The map request includes express (e.g. an address or a city) or implied (e.g. an event location) spatial criteria that specify what physical location is to be displayed on a map. Spatial criteria can include a level of resolution of the map. Spatial criteria can also include a routing request or itinerary suggestion request.

Context criteria can additionally include any combination of spatial, temporal, social or topical criteria. In one embodiment, the criteria can be related to one another using standard relational or set operators. In one embodiment, the query can be stated as a natural language query. In one embodiment, context criteria can be ranked in relative importance for each request and prioritized appropriately in the resulting population of enhanced content. The request can be regarded as containing, by default, a context which specifies the requesting user (i.e. the request is taken from the point of view of the requesting user.)

A map, which may include one or more routes, is mapped 840 by a mapping application. The context criteria is used to formulate a query based on the context criteria so as to search 860, via the network, for user profile data, social network data, spatial data, temporal data and topical data that is available via the network 842 and relates to the context as to identify enhanced content relevant to the context criteria. In one embodiment, such data is retrieved via a global index maintained by the network and included within the data available to the network 862. The map mapped in step 840 is then displayed 880 on a display medium 882 including the enhanced content retrieved in step 860.

Figure 11:
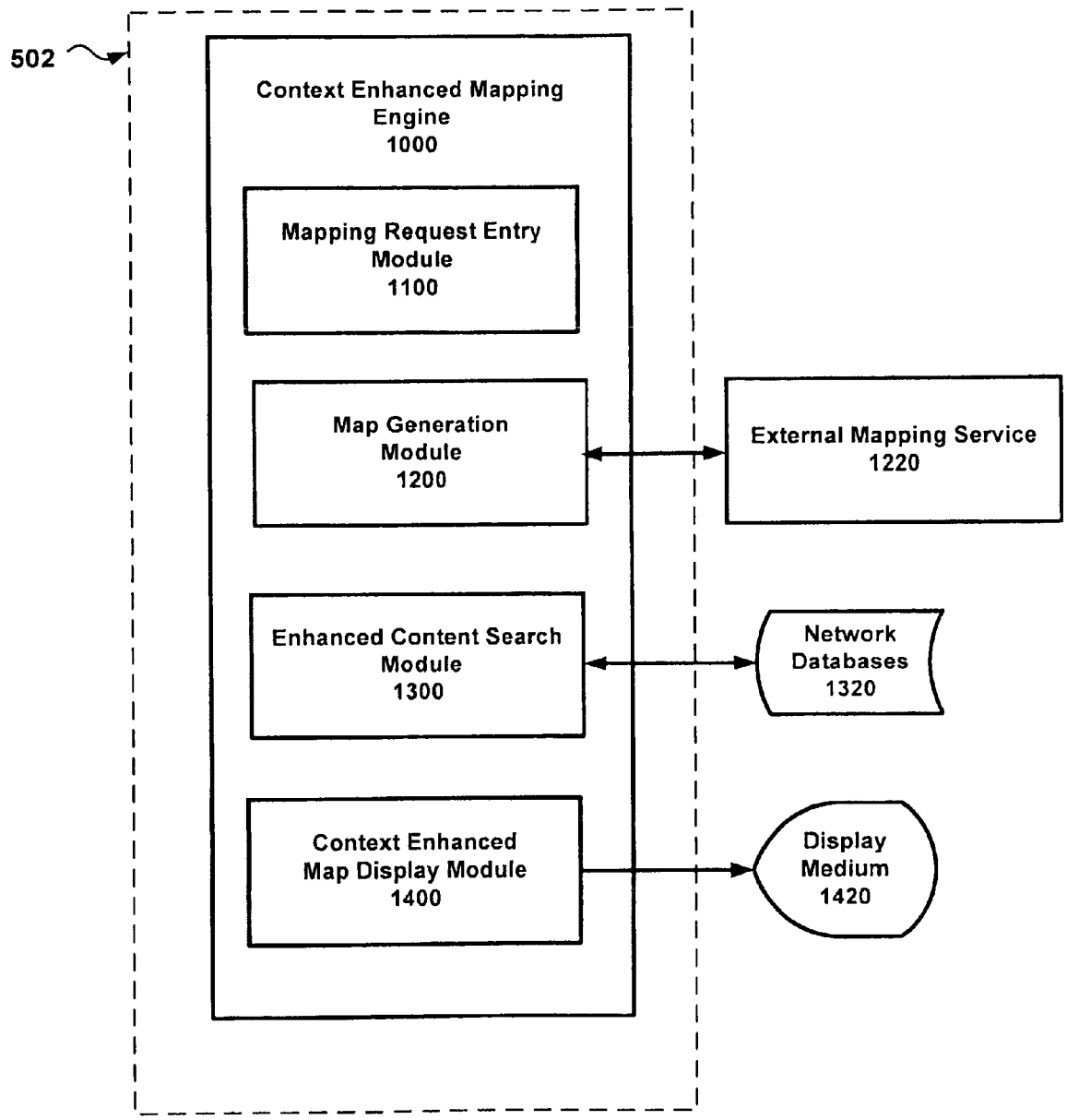
FIG. 11 illustrates the components of one embodiment of a context enhanced mapping engine.

FIG. 11 illustrates the components of one embodiment of a context enhanced mapping engine 1000. In one embodiment, the context query engine is a component of a W4 engine 502 within a W4 COMN. In alternative embodiments, the context query engine 1000 is a standalone application that has access to one or more databases containing temporal, spatial, social network and topical data relating to one or more users.

The context enhanced mapping engine 1000 includes: a mapping request entry module 1100 that provides a user interface for entry of context enhanced mapping requests; a map generation module 1200 that generates maps related to spatial criteria contained in context enhanced mapping requests; an enhanced content search module 1300 that searches network databases 1320 for enhanced content related to context criteria; and context enhanced map display module 1400 that displays maps mapped by map generation module 1200 enhanced with content retrieved by the enhanced content search module 1300 on a display medium 1420. Any of the aforementioned modules or the communications between modules (e.g. the playlist or the query) may be stored on computer readable media, for transient, temporary or permanent stage.

The interface provided by the mapping request entry module 1100 may be a graphical user interface displayable on mobile phones, gaming devices, computers or PDAs, including HTTP documents accessible over the Internet. Such interfaces may also take other forms, including text files, such as SMS, emails, and APIs usable by software applications located on computing devices. The interface provides for entry of mapping or routing requests context criteria that include spatial, temporal, social, or topical criteria.

In one embodiment, the criteria can be related to one another using standard relational or set operators. In one embodiment, temporal and spatial data obtained from sensors within user devices can be included in the context criteria. For example, the current location of a device associated with a user can be automatically identified and included in the context. The user creating the context can be automatically identified through the association of the proxy device with a user within the network and automatically included in the context.

Figure 12:
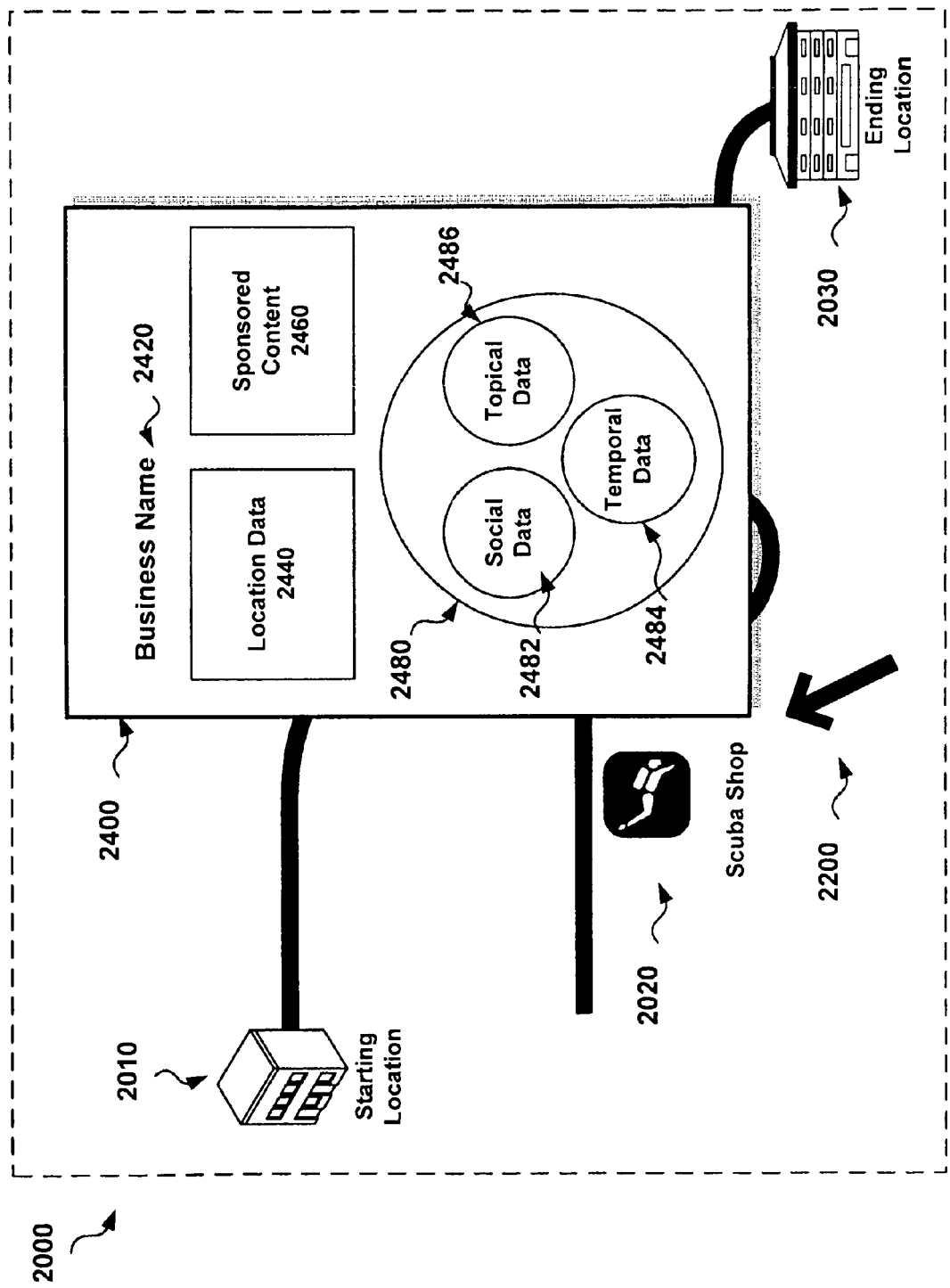
FIG. 12 illustrates how a maps with enhanced content can be displayed on a display device.

As shown in FIG. 12, the map generation module 1200 can generate maps or maps including routes using any conventional mapping or routing techniques known in the art. In one embodiment, the map generation module 1200 may use the services of a external mapping or routing application, such Yahoo! Maps.

The enhanced content search module 1300 searches one or more network databases 1320, for user profile data, social network data, spatial data, temporal data and topical data that is available via the network and relates to the map and context criteria so as to identify enhanced content that is relevant to the map and the context criteria. Such searches are performed using the capabilities of the network databases 1320 and their supporting infrastructure.

The enhanced content search module 1300, without limitation, parse query terms, identify entities and attributes of entities within the query and further identify relationships between entities and their attributes, as well as relationships to fixed data, such as times, places, and events. Entities and attributes within the query can then be cross referenced against the network databases for correspondence to entities, objects, and attributes within the network database.

In one embodiment, the network databases 1320 can include sponsored content that businesses pay to be displayed on content enhanced maps. Such sponsored content may be targeted to a specific class of users, or alternatively, be displayed on every map which displays a specific geographic area.

In one embodiment, the criteria are interpreted to take advantage of the best available data within the network. For example, if data relevant to the context resides on a relational database, the query module can execute a series of SQL statements for retrieving data from a relational database or a procedural language containing embedded SQL. Queries may be nested or otherwise constructed to retrieve data from one set of entities, and to use the result set to drive additional queries against other entities, or to use recursive data retrieval.

In the case of a W4 COMN, the context enhanced mapping request can be stored as an IO. Such an IO may itself be comprised of a cluster of linked IOs relating to topics, each IO relating to one or more context criteria. In one embodiment, the query module is a component of a correlation engine of a W4 engine. An IO relating to a context request can be mapped and represented against all other known entities and data objects in order to create both a micro graph for every entity as well as a global graph that relates all known entities with one another, and media objects relevant to the context are thereby identified. In one embodiment, such relationships between entities and data objects are stored in a global index within the W4 COMN.

In one embodiment, the context enhanced map display module 1400 displays maps with enhanced content on a user interface. The interface can be a graphical user interface displayable on computers, mobile phones, gaming devices or PDAs, including HTTP documents accessible over the Internet. Such an interface may also take other forms, including text files, such as SMS, emails, and APIs usable by software applications located on computing devices. In one embodiment, enhanced content can be displayed as an overlay of a graphical display of a map to which the content relates.

For example, maps with enhanced content can be displayed on a map in a where initially, a single symbol is displayed indicating a business entities for which there is sponsored or recommended content. In one such embodiment, further information can be displayed in a popup window regarding the selected content when a mouse cursor is moved over the symbol. FIG. 12 illustrates one possible embodiment of such an interface. A map 2000 is displayed which shows symbols for starting location 2010, an ending location 2020, and a business, a scuba shop 2030. When a mouse cursor 2200 is moved near or over the symbol for the scuba shop 2030, a popup window 2400 is displayed.

The popup window contains the business name 2420 and data regarding the location 2440, such as address, telephone number, hours of operation, and products and services offered. If sponsored content, such as a targeted advertisement, is available for the location, it is displayed in a separate area 2460 on the popup window. The popup window can also display data 2480 which reveals temporal 2484, social 2482, and topical 2486 relationships between the content and the requesting user or the map request.

In one embodiment, the context enhanced map display module 1400 can allow the requesting user can modify one or more parameters of displayed map to further customize it once initially displayed, by for example, increasing or decreasing the weighting or value of any spatial, social, temporal or topical data, data type or source. The interface 2000 can be used to apply differential weights to spatial 2400, temporal 2300, social 2100, and topical factors 2200 using sliders 2420, 2320, 2120, and 2220.

Interactive Mapping and Map Sharing and Marketing

A context enhanced map can be augmented by allowing users to edit and annotate maps after they are displayed, save those maps for future use or sharing with the public or a limited group of users.

Figure 14:
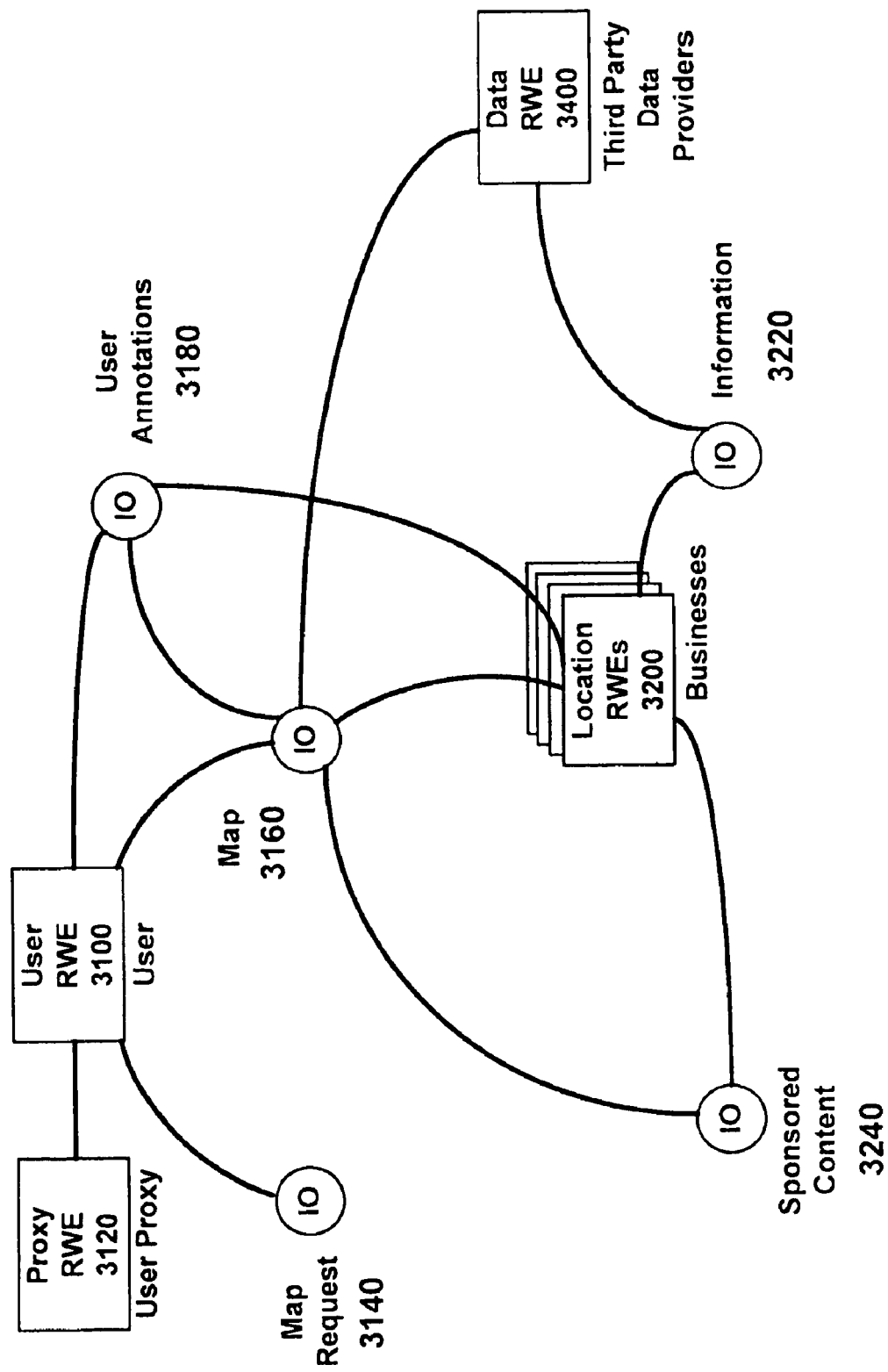
FIG. 14 illustrates one embodiment of a data model associated with a map generated by a context enhanced map request where a user is able to edit and annotate the content of a map generated in response to a context enhanced map request.

FIG. 14 illustrates one embodiment of a data model 3000 associated with a map generated by a context enhanced map request 3140 where a user is able to edit and annotate the content of a map 3160 generated in response to a context enhanced map request 3140.

The requesting user 3100 has previously entered a context enhanced map request 3140, and in response, has received a map 3160 reflecting information for one or more locations 3200 within the scope of the mapping request. Such content may include information 3220 related to the locations 3220, which may include information from third party providers 3400. Such content may also include sponsored content 3260. The system may provide an interface that allows the requesting user 3100 to annotate 3180 the map 3160 or in one embodiment add or delete locations 3200 displayed on the map.

Annotations 3180 can relate to the map or route as a whole. For example, a user may enter comments about the terrain surrounding the route or anecdotes about the trip that do not relate to specific locations, or a user may label the entire route as appropriate for a specific purpose, e.g. a great road for test-driving a sports car or the perfect romantic date. Annotations 3180 can also relate to specific locations 3200 on the map the user passed or visited, For example, the user could provide annotations reviewing restaurants or hotels the user visited along the route including rating the venue or location for a specific purpose, e.g. great for large parties, or ranking the venue or location, e.g. my favorite hotel, my least favorite restaurant.

The map IO 3160 and its annotations 3180 may be retained indefinitely. Furthermore, the map 3160 and its annotations may be of interest to other users. For example, a user may map an automobile trip proceeding from Savannah, Ga. to Key West, Fla., and specify Bed and Breakfast lodging and local restaurants featuring regional cuisine. During the course of the trip, the user may insert comments or reviews of lodging or restaurants, or even of road conditions or speed traps, the user encountered during the trip, and these annotations can be searched and used by other users in the future who plan the same or similar routes.

The map IO 3160 and its annotations 3180 can be shared on a network, for example, a W4 COMN, and be available for other users to enter additional comments about locations encountered along a route. The map IO 3160 and its annotations 3180 can be freely shared on a network and provide a resource for network users who plan to make a similar itinerary. Alternatively, a user could choose to charge other users a fee to view the map and its annotations, and the Network then presents such annotated maps with the terms of use to new users and any users, tracks acceptances and debits the consuming user and credits the publishing user, third-party or Network affiliate.

Creation of persistent maps additionally creates marketing opportunities for businesses. A business may create a map or trip IO 3160 reflecting, for example, travel tips and recommendations for a route driving down the coast from New York City to Hilton Head, S.C. The map could feature hotels along the route from a specific hotelier such as Hilton or Marriott. The locations on the route 3200 could, individually be associate with sponsored content 3240, such as advertisements for specific locations. Alternatively, the map itself could be associated with sponsored content 3240.

Where a map IO 3160 references content, directly or indirectly, from third party data sources which require a subscription or which otherwise charge a fee for accessing such content, the map IO 3160 may be viewable by any user, but may require a subscription or a fee for viewing fee based content.

In one embodiment, when a user enters a context enhanced mapping request 3140, the network may match the request against preexisting maps 3160 that have been retained by the system and offer the user an opportunity to view maps that have been developed by other users or commercial entities such as businesses.

Users who create shared maps 3160 may additionally be compensated by businesses 3200 for recommending the services of the businesses within the map when other users access such maps or display sponsored content associated with the business Such compensation can be monetary or non-monetary. Examples of non-monetary compensation can include certification, association, recommendation, linking, as well as network reputation scores or credits of some form exchangeable for other products or services, e.g. loyalty points or airline miles.

Figure 15:
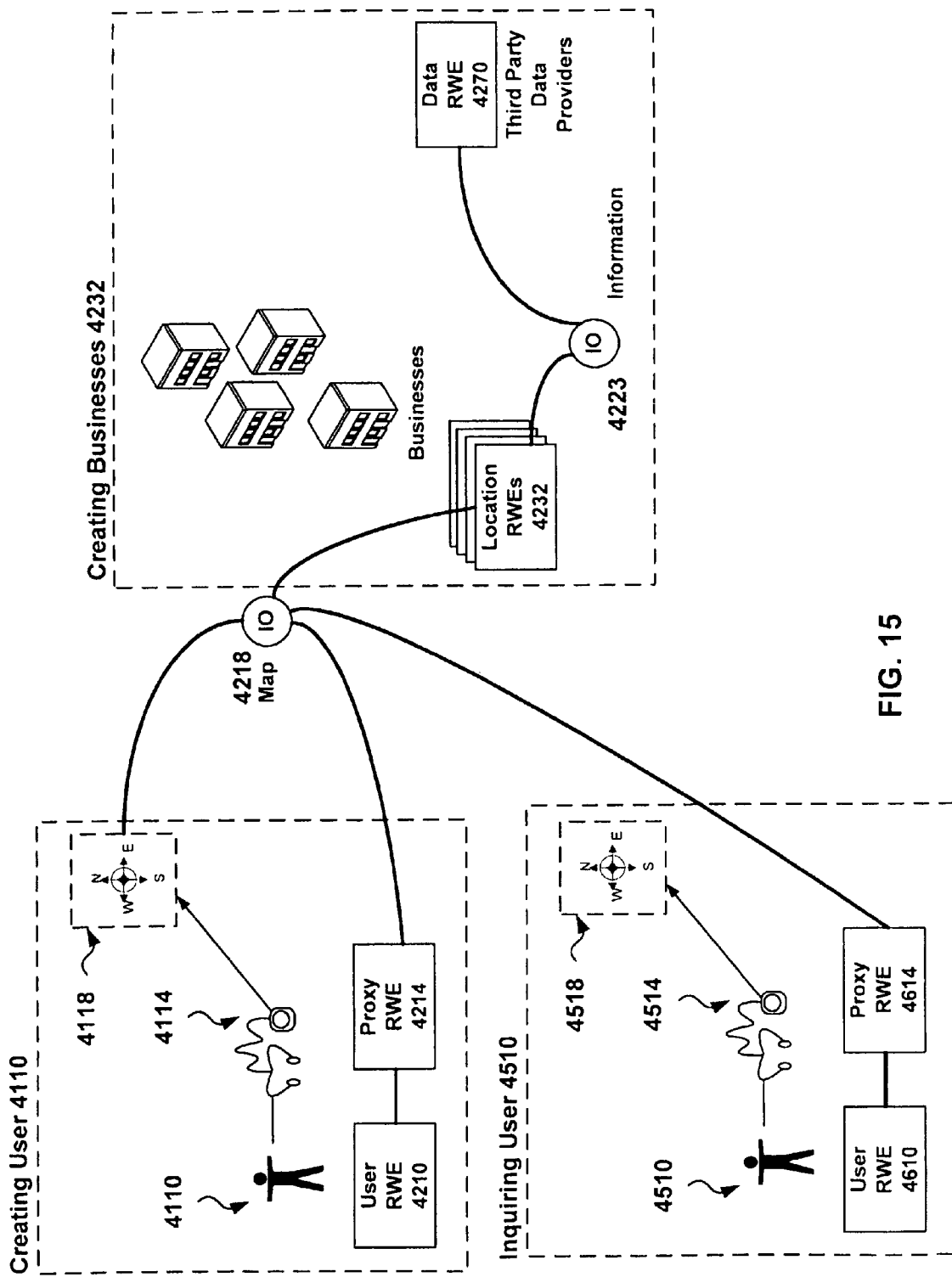
FIG. 15 illustrates a conceptual embodiment of a system that allows users and businesses to share maps with enhanced content.

FIG. 15 illustrates a conceptual embodiment of a system 4000 that allows users and businesses to share maps with enhanced content. A user 4210 RWE can enter a context based mapping request through a proxy device 4214 that creates a map 4218 displayed on the user proxy device 4118. The user 4210 can further customize the map 4218 with annotations. The map is represented within the network, for example, a W4 COMN, as a map IO 4218 which contains all data relating to the map. The user 4210 can elect to store the map IO on the network for future access by the user 4210, or by other users.

Alternatively, or additionally, businesses 4232 RWEs can enter a context based mapping request for a map 4218 that is displayable on user proxy devices 4118. The map is represented within the network, for example, a W4 COMN, as a map IO 4218 which contains all data relating to the map. The businesses RWEs 4232 can customize the map 4218 with annotations and can further associate the map with content from third party data providers 4270. The businesses 4210 can elect to store the map IO on the network for future access by the user RWEs 4210, 4610 or by other users.

An inquiring user RWE 4610 can enter a context enhanced map request using a proxy device 4514. Such a request can be processed and may match one or more stored maps 4218 which can be displayed on the user's proxy device 4514. The inquiring user RWE 4610 can select a map 4218 to have access to the customized content available through the map.

Figure 16:
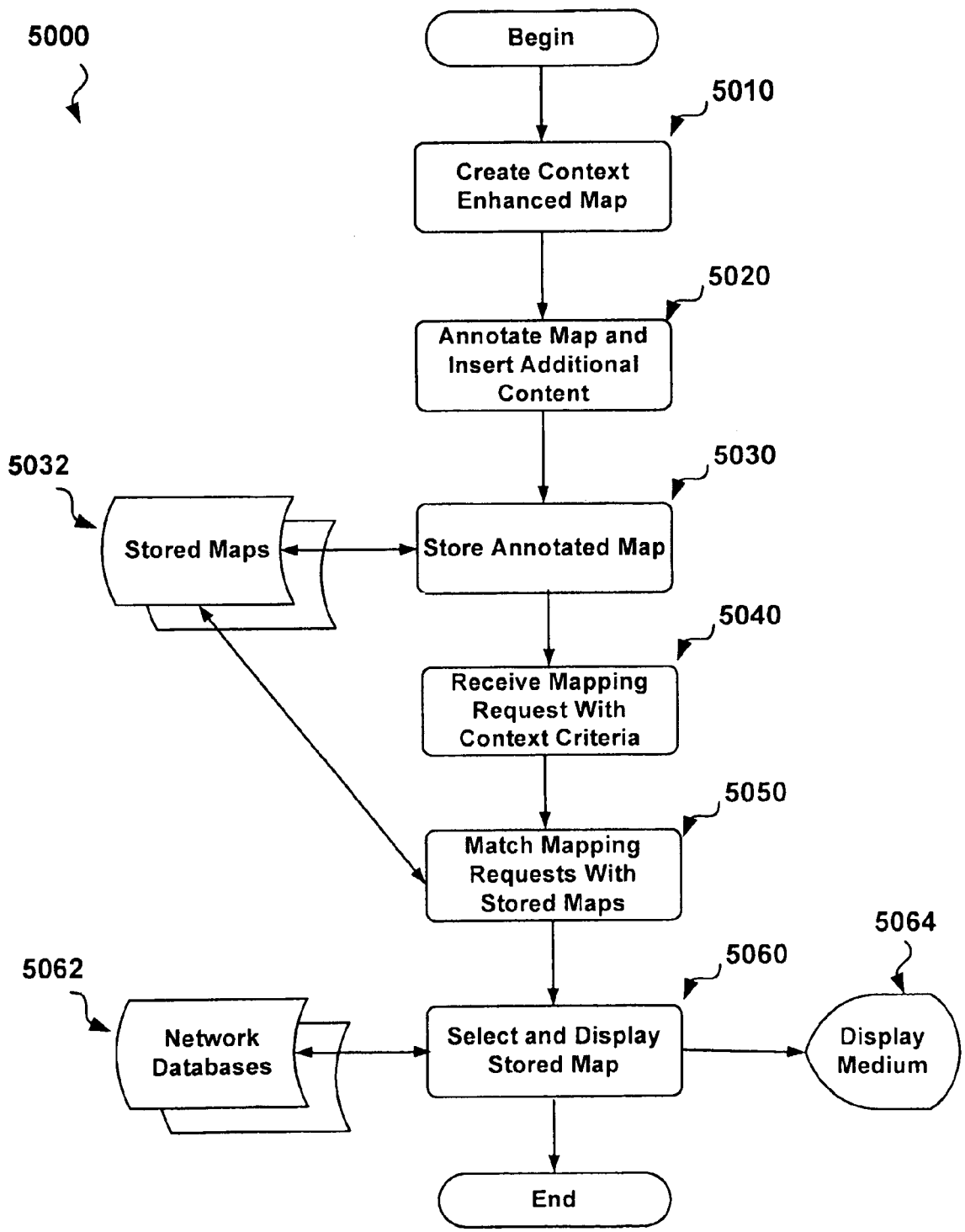
FIG. 16 illustrates one embodiment of a process of how context enhanced maps can be created and stored on a network containing temporal, spatial, and social network and topical data for a plurality of users, devices, and locations (such as a W4 COMN.)

FIG. 16 illustrates one embodiment of a process 5000 of how context enhanced maps can be created and stored on a network containing temporal, spatial, and social network and topical data for a plurality of users, devices, and locations (such as a W4 COMN.

The process begins when a user or a business creates a context enhanced map 5010 using, for example, a process such as that illustrated in FIG. 10. The map is then annotated and additional content, included paid or sponsored content is inserted into the map 5020. The annotated map is then stored 5030 on the network 5032 for access by other users. When users enter context enhanced mapping requests 5040, the system attempts to match 5050 the request to stored maps 5032. A stored map that matches the context enhanced mapping requests is then selected 5060, populated with data 5062 relating to the stored map 5032 and displayed on a display medium.

Figure 17:
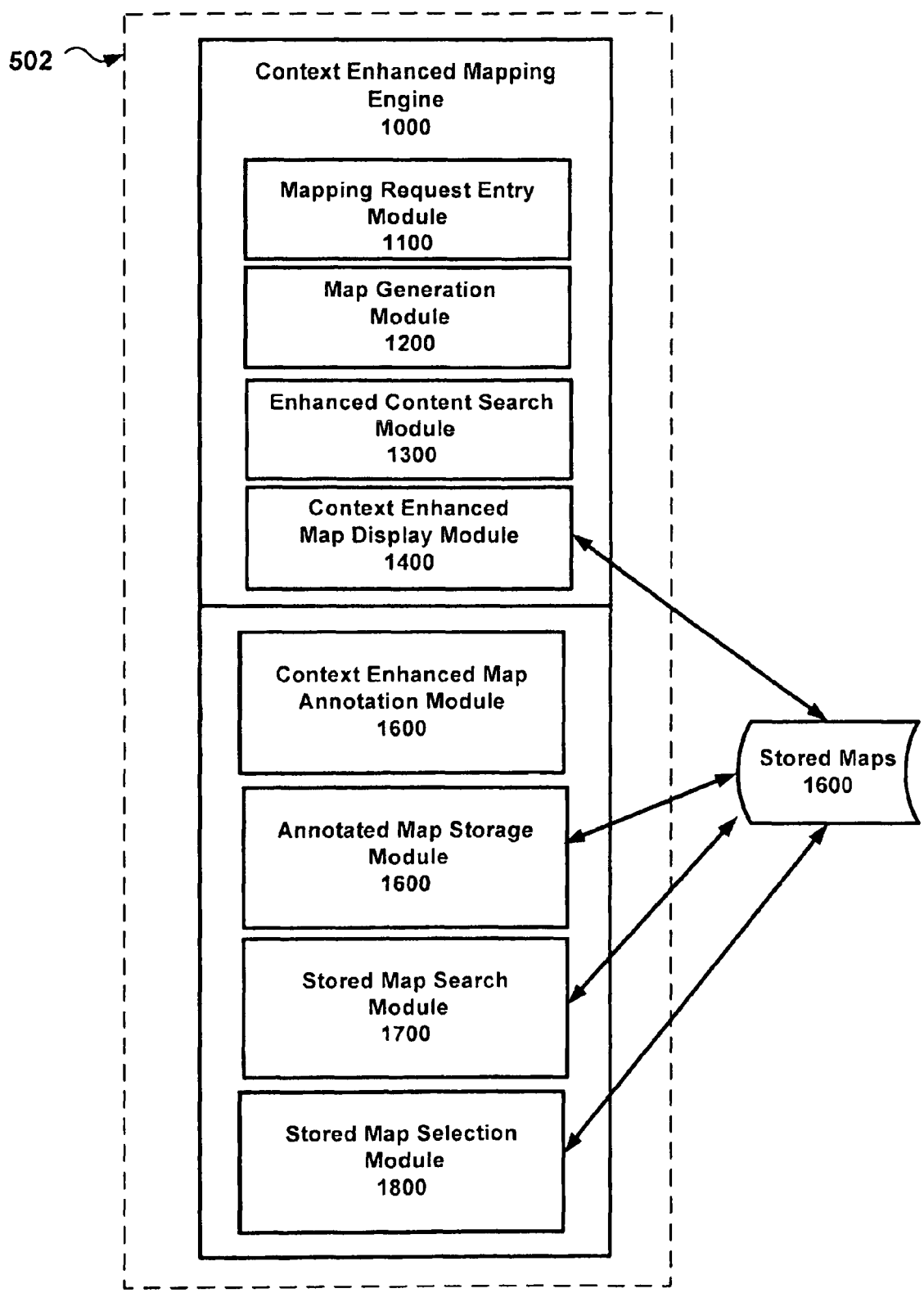
FIG. 17 illustrates how the embodiment of a context enhanced mapping engine shown in FIG. 11 can be extended to support the process illustrated in FIG. 16.

FIG. 17 illustrates how the embodiment of a context enhanced mapping engine 1000 shown in FIG. 11 can be extended to support the process illustrated in FIG. 16. In one embodiment, the context query engine is a component of a W4 engine 502 within a W4 COMN. In alternative embodiments, the context query engine 1000 is a standalone application that has access to one or more databases containing temporal, spatial, social network and topical data relating to one or more users.

The mapping request entry module 1100, the map generation module 1200, the enhanced content search module 1300 and the context enhanced map display module 1400 all provide the functionality described with respect to FIG. 10 above, but are supplemented by additional modules and provide additional functionality.

A context enhanced map annotation module 1500 allows a user or other entity to annotate context enhanced maps and insert additional content, which may include paid or sponsored content. The module may provide a user interface for entry of annotations. In one embodiment, the user interface is implemented as part of the map display provided by the context enhanced map display module 1400.

An annotated map storage module 1600 allows a user or other entity to store annotated content enhanced maps 1620 on the network. A stored map search module 1700 uses context enhanced mapping requests to search for stored maps that satisfy the criteria of context enhanced mapping requests. A stored map selection module 1800 allows a user to select a stored map for display by the context enhanced map display module 1400. The stored map selection module 1800 may provide a user interface for selection of stored maps. In one embodiment, the user interface can be implemented as part of the map display provided by the context enhanced map display module 1400.

W4 Map Engine Smart Map UI

A W4 Smart Map User Interface (UI) is an interactive display of W4 map data corresponding to spatial, social, temporal and topical data output from enhanced context mapping. Such interfaces may also take other forms, including text files, such as SMS, emails, and APIs usable by software applications located on computing devices. The interface may provide for entry of mapping or routing requests in view of context criteria input by a user that includes spatial, temporal, social, or topical criteria, in connection with context enhanced mapping. The Smart UI provides representations of locations and/or events with one or more types of W4 data. The locations can be physical locations and/or virtual locations (i.e., Second Life, World of Warcraft maps, any type of map, or any type of virtual reality environment). The UI provides a 3D representation of RWEs and IOs as a collection of interactive content representative based on a correlation between the W4 data corresponding to the RWEs and IOs. The UI provides a visible display of the context enhanced mapping, as discussed above.

Figure 13:
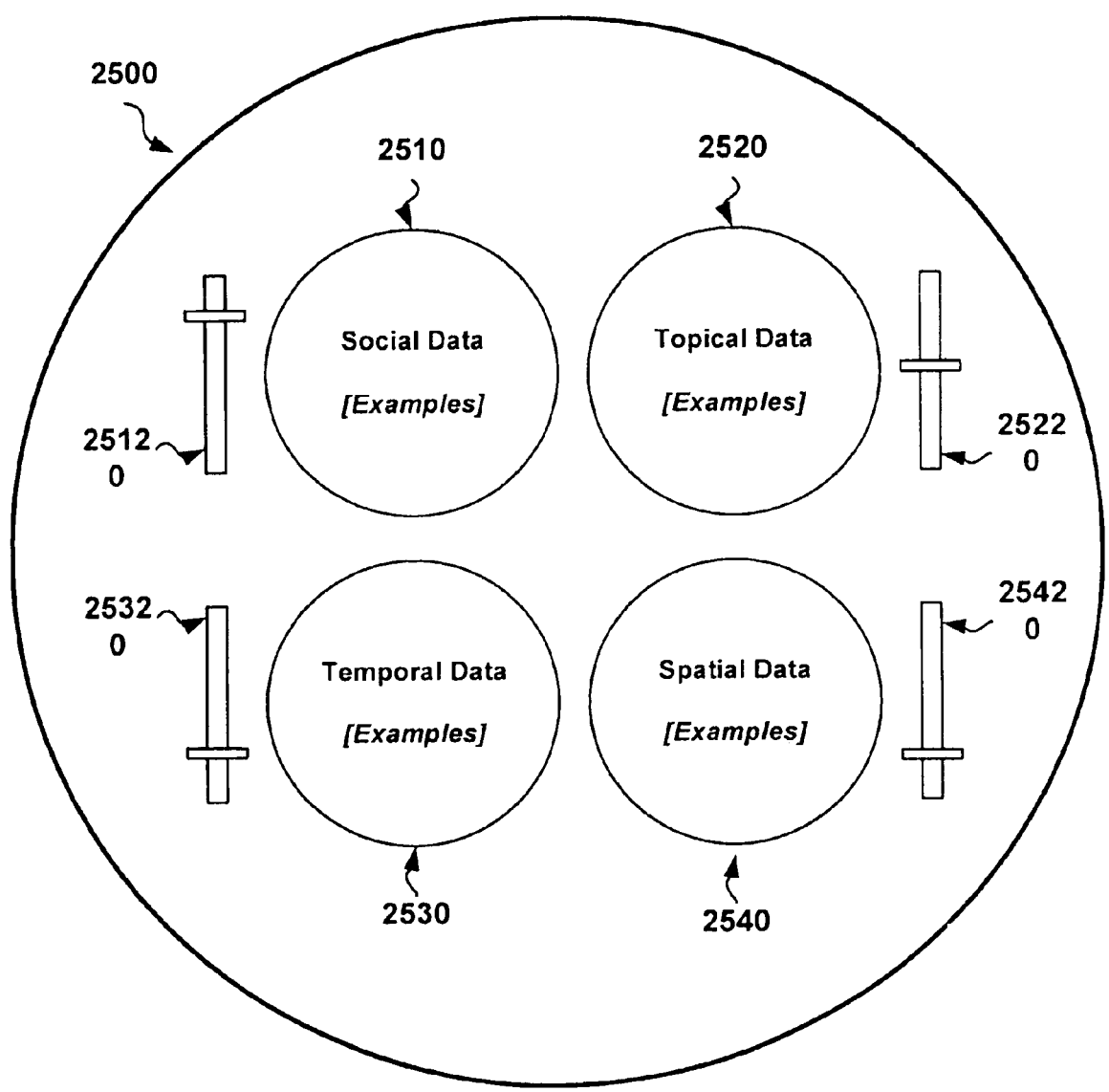
FIG. 13 illustrates one embodiment of a popup in interface element displayed when a user passes a mouse cursor over an symbol representing a business which is displayed on a content enhanced map.
Figure 18:
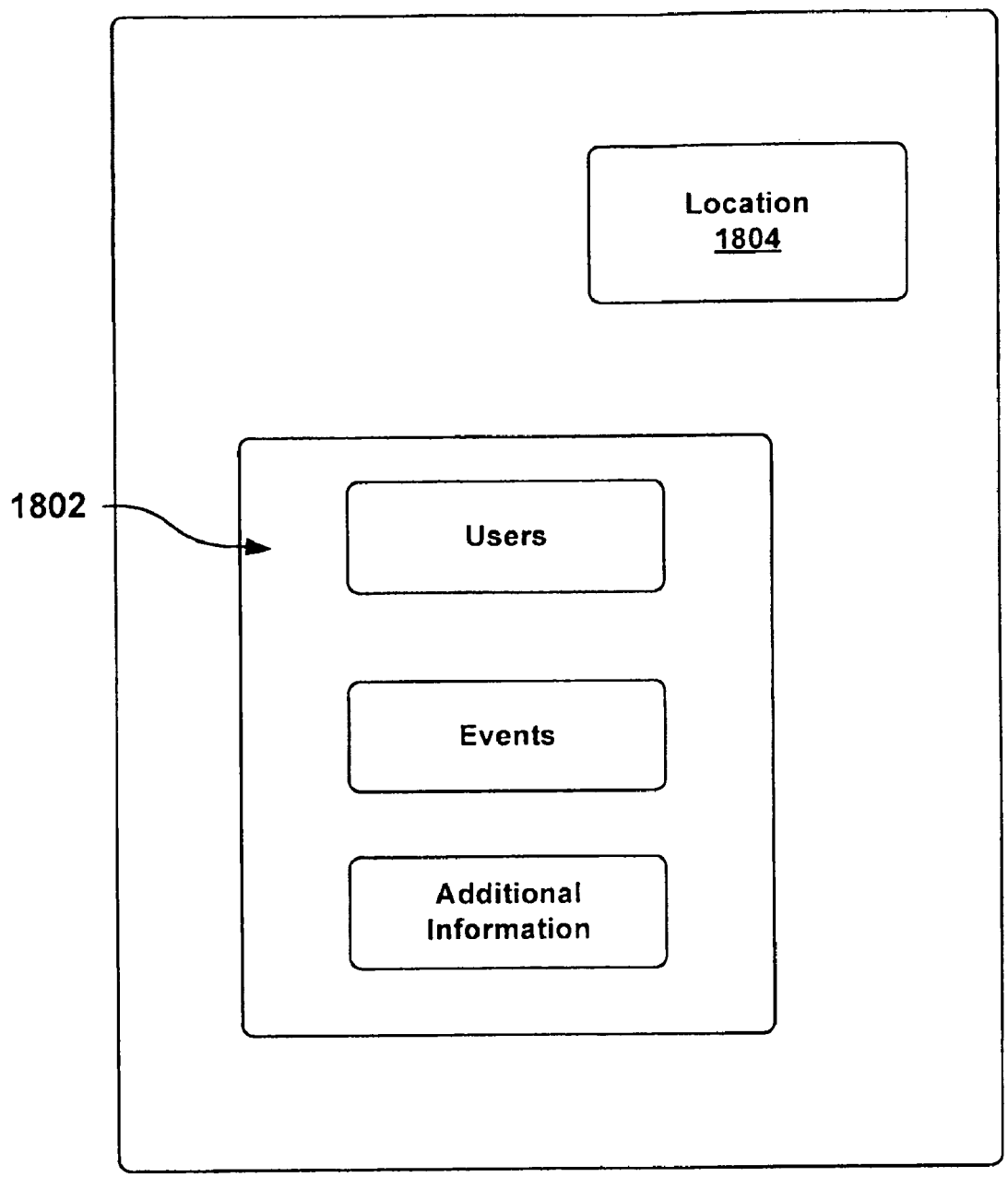
FIG. 18 illustrates an embodiment a Smart Map User Interface in which enhanced content can be displayed on a display device.

The Smart UI is a display of W4 data produced by context enhanced mapping, as shown in FIG. 18. The Smart UI may be a graphical user interface displayable on mobile phones, gaming devices, computers or PDAs, including HTTP documents accessible over the a network. The display provides a map with entities produced by a user query, as discussed above. The Smart UI 1800 can display a map or maps including routes or a graphical layout of an area using any conventional mapping or routing techniques known in the art (as a portion or portions of the display). The map generation module 1200 of FIG. 12 provides the functionality for such external mapping or routing application, such as Yahoo! Maps, to be displayed in the Smart UI 1800. As shown in FIG. 18, the Smart UI 1800 provides an implementation of the popup interface element displayed when a user passes a mouse cursor over a symbol representing an element of W4 data, as discussed in FIG. 13. For example, in one embodiment, a location 1804 can be displayed along with media 1802 (as a portion or portions of the display), which can represent other users who have been there, plan to be there or are currently there (via faces, avatars, icons, images, video clips or any other type of image known in the art), events that at that location 1804, or any other type of relevant information that could be useful to a user. In this embodiment, the media 1802 displayed with the location 1804 data provide a content-inclusive representation of related W4 data produced from context enhanced mapping. In some embodiments, media 1802 attached or descriptive of a virtual location 1804 can be the virtual location in map form that corresponds to a physical location by tacit or implicit correspondence. For example, the Yahoo! building in Second Life annotations can also be retrievable in a physical location on a map, and vice versa. The location 1804 can represent an address, a street corner, city, state, neighborhood, any other type of location, which can be defined on a map, or any other type of location that can be defined in a virtual reality environment. In some embodiments, the media 1802 and the location 1804 may be 3D images.

Figure 19:
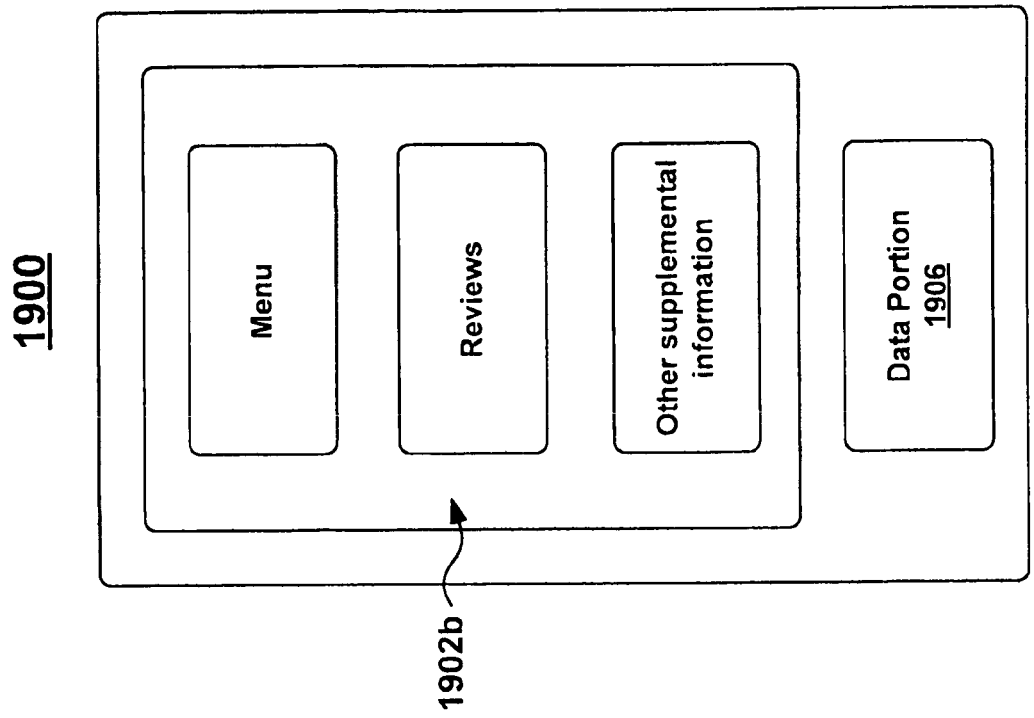
FIG. 19 illustrates an embodiment of a User Interface where stacks of enhanced content can be displayed via flip-stacks.
Figure 19:
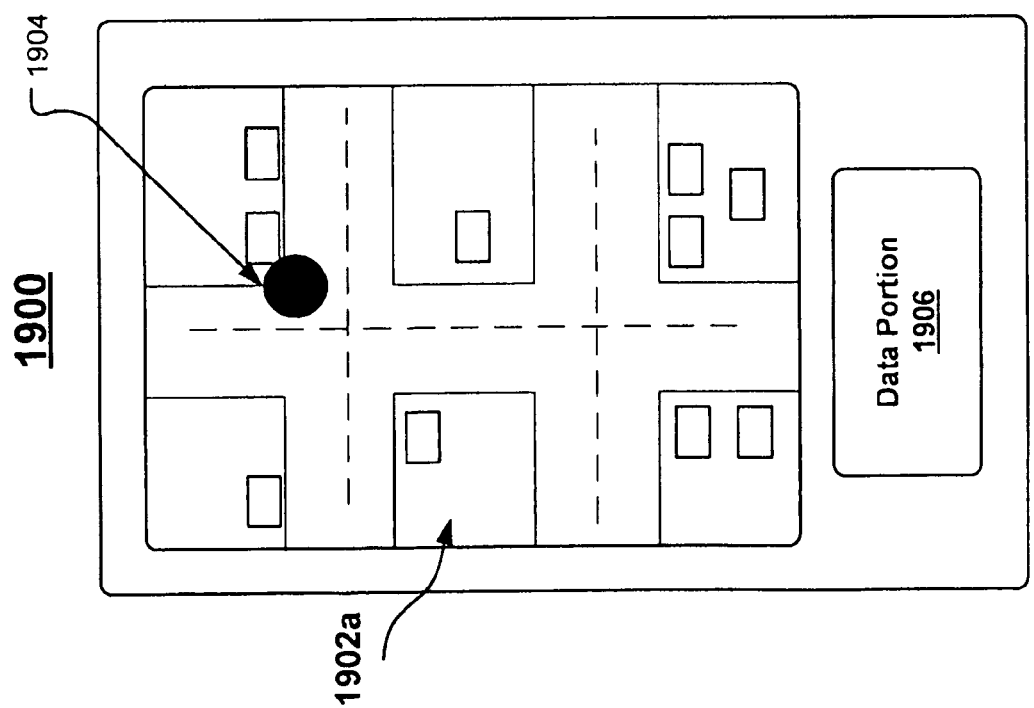

In some embodiments, the images, which can be 3D images, may be stacks of media images or videos populated with known media content linked to the data produced from context enhanced mapping, as illustrated in FIG. 19. In some embodiments, the Smart UI displays RWEs and IOs associated with entities in a 3D projection. The RWEs and associated IOs may comprise at least one flip-stack 1902*a-b* for each entity. The flip stack 1902*a-b* provides the user the ability to access stored media corresponding to the RWE or IO being displayed. The Smart UI 1900 provides functionality in order for the flip-stack 1902*a-b* to display at least one entity in one state depicting data in one manner, and subsequent to a user input, the flip-stack 1902*a* changes states, and provides alternative or additional data corresponding to the depicted data as flip-stack 1902*b*. According to some embodiments, displayed on the Smart UI 1900 is map 1902*a* of a particular location 1904, as discussed in relation to FIG. 18. In some embodiments, the map 1902*a*, may be resized according to the level of detail needed to show the particular location 1904. The resizing can be user controlled or automated. Upon the user either rolling the mouse cursor or clicking on the icon 1902*a*, additional data corresponding to the particular location 1904 is displayed in the flip-stack icon 1902*b*. According to some embodiments, the user input may also comprise selecting the flip stack 1902*a-b* in order to manipulate, expand, annotate, etc the data comprised in the flip-stack 1902*a-b*. In accordance with the information displayed in the flip-stacks 1902*a-b*, a corresponding data block 1906 comprising descriptive information describing and/or detailing the displayed flip-stack 1902*a-b* is also displayed in the Smart UI. The data block 1906, in accordance with media 1802 of FIG. 18, can present information representing other users who have been at the particular location 1904, plan to be there or are currently there (via faces, avatars, icons, photos, video clips or any other type of image known in the art), events that at that location 1904, or any other type of relevant information that could be useful to a user. For example, originally displayed in the flip-stack is an icon depicting a restaurant and exact location on a map. Subsequent to an input by a user, data corresponding to attributes of the restaurant such as the menu, reviews, price range and/or any other type of information that could help an individual decide on selecting a restaurant, can be displayed in the flip-stack icon 1902*b*. According to some embodiments, the data block 1906, media 1802, and flip-stack icons 1902*a-b* may provide a user the ability to annotate data and/or input additional data.

Figure 20:
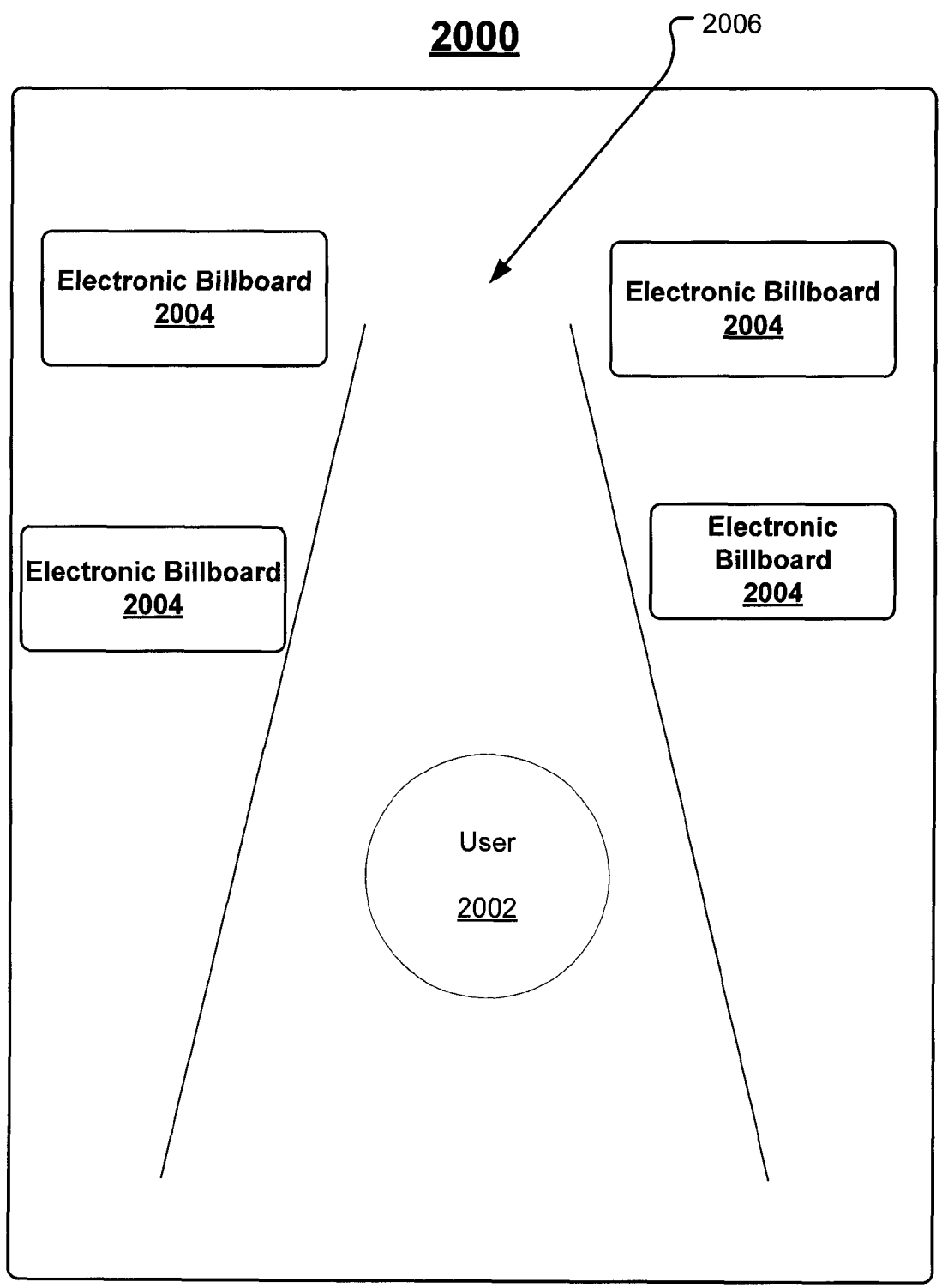
FIG. 20 illustrates an embodiment of a User Interface where enhanced content can provides an interactive environment.

According to some embodiments, specific locations may comprise electronic billboards of information related to that location and its associated RWEs and IOs, as shown in FIG. 20 and herein referred to as a shopping mall display 2000. The shopping mall display 2000 may be based on a query that relates to a location 2006 remote to an end user 2002. In some embodiments, the shopping mall display 2000 on the Smart UI can be a virtual-reality type display which situates the user 2002 at the location 2006 from the query. The location may also relate to the current location 2006 of the user 2002. According to some embodiments, the current location 2006 may be displayed in real-time based on the current physical location of the user 2002. The real-time location data is form of the context based map query, as discussed in FIG. 10. In conjunction with the location 2006 displayed in the shopping mall display 2000 on the Smart UI, an number of electronic billboards 2004 detailing RWEs and IOs corresponding to the location 2006 can displayed to the end user 2002. The location 2006 can range from the likes of a map of neighborhood or city to stores and intricacies of a shopping mall. For explanatory purposes, and by no way a limiting example, FIG. 20 illustrates a virtual reality type shopping mall display 2000 of a user 2002 in a shopping mall (as the location 2006), thereby viewing stores (as electronic billboards 2004). According to some embodiments, the virtual reality type view of the shopping mall display 2000, can be updated in real-time, thereby generating feel as if the user 2002 is traveling through the location 2006 (shopping mall); the electronic billboards 2004 (stores) will change as the user 2002 changes locale or position within the location 2006. The electronic billboards 2004 may be any type of information icon that can provide the user 2002 desired information the user 2002 requests or information corresponding to the location 2006. Electronic billboards 2004 may comprise any type of data relating to music, video, stories, sports, images, reviews, ratings, advertisements, inventory, and/or any other type of information corresponding to the RWEs and IOs of that location 2006. In some embodiments, the electronic billboards 2004 may be flip stacks 1902*a-b*, as discussed in FIG. 19. For example, the flip stack 1902*a* may display a map providing directions to a specific location, and flip stack 1902*b* may be an electronic billboard 2004.

According to some embodiments, the maps and locations discussed in FIGS. 18-20 may comprise information relating to events including concerts, conferences, fairs, exhibits, or any other type of event or occasion. In some embodiments, the maps and locations discussed in FIGS. 18-20 may display information relating to a specific point in time: past, present, and/or possibly a scheduled future event at a specific location. According to some embodiments, the maps and locations discussed in FIGS. 18-20 may be bounded physical areas, such as neighborhoods, and in some embodiments, expand or contract in relative size, based on a user's relative interest (based on a query, a profile or other users, as discussed in FIG. 9). According to some embodiments, the maps and locations discussed in FIGS. 18-20 may be based on importance of the surrounding area or region, not particularly the size of the specific location or map. According to some embodiments, the Smart UI may be specialized and optimized based on particular users and/or related and associated content. The Smart UI provides interactive 3D interface for exploring a personalized representation of the physical world, a virtual world, and/or any W4 data as a combination or separately. The W4 data displayed in the Smart UI may be modified based upon content, context and/or user requests.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

We claim:

1. A computing device, comprising:
   a processor;
   a storage medium for tangibly storing thereon program logic for execution by the processor, the program logic comprising:
   logic for displaying a user interface on a display device comprising:
      logic executed by the processor for displaying a user interface on a display device, the user interface comprising:
         a first portion comprising a map of a region, the map comprising a visible indication of an identified location; and
         a second portion comprising a plurality of media representing, at least in part, spatial, temporal, topical, and social data available to a network and associated with the location, and based on a context of a user, the context comprising social criteria, topical criteria and temporal criteria relating to the user;

such that each of the plurality of media are user interactive to enable retrieval of additional spatial, temporal, topical, and social data associated with a selected one media of the plurality of media, wherein at least one of the plurality of media is displayed as an electronic billboard, the electronic billboard displaying information associated with the additional spatial, temporal, topical, and social data associated with the selected one media.

2. The computing device of claim 1, wherein the first portion and the second portion are non-overlapping.

3. The computing device of claim 1, wherein the first portion and the second portion are at least partially overlapping.

4. The computing device of claim 1, wherein the first portion and the second portion are completely overlapping.

5. The computing device of claim 1, further comprising:
a third portion, the third portion comprising the additional spatial, temporal, topical, and social data associated with the selected one media of the plurality of media, the third portion is at least partially overlapping of at least one of the first portion and the second portion.

6. The computing device of claim 5, wherein the third portion is at least partially overlapping of at least one of the first portion and the second portion.

7. The computing device of claim 5, wherein the third portion is completely overlapping of at least one of the first portion and the second portion.

8. The computing device of claim 1, wherein the plurality of media are based at least in part on information associated with an identity of the user.

9. The computing device of claim 1, wherein the map of the region corresponds to an area surrounding the identified location.

10. The computing device of claim 1, wherein the map of the region corresponds to an exact location.

11. The computing device of claim 1, wherein the selected one media of the plurality of media is displayed as a flip-stack icon, the flip-stack icon displaying the additional spatial, temporal, topical, and social data associated with the selected one media of the plurality of media.

12. The computing device of claim 1, wherein the the context is provided by the user.

13. The computing device of claim 1, wherein the identified location is a physical location.

14. The computing device of claim 1, wherein the identified location is virtual location within a virtual reality environment.

15. The computing device of claim 1, further comprising the plurality of media associated with the location corresponding to both a virtual location within a virtual reality environment and a physical location, the virtual location and physical location both define the identified location.

16. A method, comprising:
generating, using a computing device, a first portion comprising a map of a region, the map comprising a visible indication of an identified location; and
generating, using the computing device, a second portion comprising a plurality of media based at least in part on spatial, temporal, topical, and social data available to a network and associated with the location, and based on a context of a user, the context comprising social criteria, topical criteria and temporal criteria relating to the user;
such that each of the plurality of media are user interactive to enable retrieval of additional spatial, temporal, topical, and social data associated with a selected one media of the plurality of media, wherein at least one of the plurality of media is displayed as an electronic billboard, the electronic billboard displaying information associated with the additional spatial, temporal, topical, and social data associated with the selected one media.

17. The method of claim 16, wherein the first portion and the second portion are non-overlapping.

18. The method of claim 16, wherein the first portion and the second portion are at least partially overlapping.

19. The method of claim 16, wherein the first portion and the second portion are completely overlapping.

20. The method of claim 16, further comprising:
generating, using the computing device, a third portion, the third portion comprising the additional spatial, temporal, topical, and social data associated with the selected one media of the plurality of media, the third portion is at least partially overlapping of at least one of the first portion and the second portion.

21. The method of claim 20, wherein the third portion is at least partially overlapping of at least one of the first portion and the second portion.

22. The method of claim 20, wherein the third portion is completely overlapping of at least one of the first portion and the second portion.

23. The method of claim 16, wherein the selected one media of the plurality of media is displayed as a flip-stack icon, the flip-stack icon displaying the additional spatial, temporal, topical, and social data associated with the selected one media of the plurality of media.

24. The method of claim 16, wherein the plurality of media are based at least in part on information associated with an identity of the user.

25. The method of claim 16, wherein the context is provided by the user.

26. The method of claim 16, wherein the identified location is a physical location.

27. The method of claim 16, wherein the identified location is virtual location within a virtual reality environment.

28. The method of claim 16, further comprising the plurality of media associated with the location corresponding to both a virtual location within a virtual reality environment and a physical location, the virtual location and physical location both define the identified location.

* * * * *